United States Patent
Hagano et al.

(10) Patent No.: US 6,983,773 B1
(45) Date of Patent: Jan. 10, 2006

(54) OIL FEEDER OF FUEL TANK

(75) Inventors: Hiroyuki Hagano, Aichi-ken (JP); Masayuki Nakagawa, Aichi-ken (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 241 days.

(21) Appl. No.: 10/381,058

(22) PCT Filed: Sep. 26, 2001

(86) PCT No.: PCT/JP01/08401

§ 371 (c)(1),
(2), (4) Date: Mar. 26, 2003

(87) PCT Pub. No.: WO02/26515

PCT Pub. Date: Apr. 4, 2002

(30) Foreign Application Priority Data

Sep. 27, 2000 (JP) .................................... 2000-293570
Sep. 29, 2000 (JP) .................................... 2000-298335

(51) Int. Cl.
*B65B 1/04* (2006.01)
*B65B 3/00* (2006.01)
*B67C 3/00* (2006.01)

(52) U.S. Cl. ...................... 141/350; 141/348; 141/349
(58) Field of Classification Search ................. 141/59, 141/301, 302, 348–350, 351; 220/86.2, 231, 220/360; 137/588, 629
See application file for complete search history.

(56) References Cited

U.S. PATENT DOCUMENTS

| | | | |
|---|---|---|---|
| 1,995,960 A | 11/1934 | Boyd | |
| 3,926,444 A | 12/1975 | Gripe et al. | |
| 4,598,741 A | 7/1986 | James et al. | |
| 4,966,299 A | 10/1990 | Teets et al. | |
| 5,056,570 A | * 10/1991 | Harris et al. | .................. 141/59 |
| 5,271,438 A | * 12/1993 | Griffin et al. | ................. 141/59 |
| 6,009,920 A | 1/2000 | Palvoelgyi et al. | |

FOREIGN PATENT DOCUMENTS

| | | |
|---|---|---|
| DE | 198 53 157 A1 | 11/1998 |
| DE | 198 53 157 A1 | 5/2000 |
| EP | 0 778 327 A1 | 3/1995 |
| JP | U-2-100923 | 8/1990 |
| JP | A-8-25984 | 1/1996 |
| JP | 8-142694 | 6/1996 |
| JP | A-8-142694 | 6/1996 |
| JP | 8-25984 | 10/1996 |

OTHER PUBLICATIONS

"Passive Fuel Cap", Kenneth Mason Publishing, 34099, XP 000328714, GB, No.340, Aug. 1992, pp. 658–659.

* cited by examiner

*Primary Examiner*—Timothy L. Maust
(74) *Attorney, Agent, or Firm*—Posz Law Group, PLC

(57) ABSTRACT

A fuel feeding device 10 has a first shutter mechanism 20 that has a first closing member 21 to open and close a first seal opening UP1, a second shutter mechanism 30 that has a second closing member 31 to open and close a second seal opening UP2, and a coupling mechanism 40 that guides the second closing member 31 to be opened and closed in conjunction with the opening and closing action of the first closing member 21. In the process of fuel supply, when a fuel supply gun presses open the first closing member 21, the second closing member 31 moves in conjunction with the first closing member 21 via the coupling mechanism 40 to open the second seal opening UP2. In the fuel feeding device 10 for a fuel tank, the opening and closing mechanism of the closing member arranged in an inlet pipe IP is substantially free from any significant trouble.

19 Claims, 18 Drawing Sheets

OIL FEEDER OF FUEL TANK

TECHNICAL FIELD

The present invention relates to a fuel feeding device used for feeding a supply of fuel to a fuel lank through a fuel conduit of an inlet pipe. More specifically the invention pertains to a mechanism of opening and closing the fuel conduit and a sealing mechanism.

BACKGROUND ART

A prior art fuel feeding device is disclosed, for example, in U.S. Pat. No. 6,009,920. This technique uses a first closing member disposed at an inlet opening of an inlet pipe and a second closing member disposed inside the inlet pipe. Gaskets are interposed for sealing between the first closing member and the inlet pipe and between the second closing member and the inlet pipe. At each time of fuel supply, the user manually pulls up the first closing member and inserts a fuel supply gun into the inlet pipe to press open the second closing member.

In this prior art fuel feeding device, since the fuel supply gun presses open the second closing member at every time of fuel supply, the second closing member receives a large load and may be damaged occasionally.

DISCLOSURE OF THE INVENTION

The object of the present invention is thus to solve the problem of the prior art technique and to provide a fuel feeding device for a fuel tank, which has a substantially trouble-free opening-closing mechanism of a closing member disposed in an inlet pipe. The object of the present invention is also to provide a structure that ensures excellent sealing properties according to the characteristics of gaskets.

The present invention is directed to a fuel feeding device for a fuel tank, which is used to feed a supply of fuel to the fuel tank through a fuel conduit. The fuel feeding device includes: a partition member that parts the fuel conduit into an opening-side conduit section and a tank-side conduit section; a conduit forming member that is provided with a first seal opening disposed in the opening-side conduit section and a second seal opening formed in the partition member; a first shutter mechanism that has a first closing member to open and close the first seal opening; a second shutter mechanism that has a second closing member to open and close the second seal opening; and a coupling mechanism that guides the second closing member to be opened and closed in conjunction with the opening and closing action of the first closing member.

In the process of fuel supply with the fuel feeding device of the present invention, when a fuel supply gun is inserted to press open the first closing member of the first shutter mechanism, the opening motion is transmitted to the second closing member of the second shutter mechanism via the coupling mechanism and makes the second closing member open the second seal opening. On completion of the fuel supply, when the fuel supply gun is drawn out of the second seal opening and the first seal opening, the first closing member is closed. The closing motion of the first closing member is transmitted to the second closing member via the coupling mechanism and makes the second closing member close the second seal opening. In this manner, the second closing member is opened and closed in conjunction with the opening and closing action of the first closing member that directly receives the force from the fuel supply gun.

The fuel feeding device of this structure ensures double sealing of the fuel tank from the outside by means of the first shutter mechanism and the second shutter mechanism, so as to desirably reduce the emission of the fuel vapor from the fuel tank.

The second closing member opens the second seal opening in conjunction with the opening motion of the first closing member transmitted via the coupling mechanism. The second seal opening has already been open when the fuel supply gun reaches the second seal opening. The fuel feeding device accordingly does not receive any large force and is substantially free from significant troubles.

The required action for fuel supply is only inserting and drawing the fuel supply gun into and out of an inlet pipe via the first seal opening and the second seal opening. This arrangement does not require any manual opening or closing action and accordingly ensures preferable operating ability.

A diversity of structures, for example, a linkage mechanism, a gear mechanism, and a cam mechanism, may be applied to the coupling mechanism of the present invention.

In one preferable embodiment of the present invention, the coupling mechanism has: a guide member that moves up and down with a pivotal rotation of the first closing member, so as to make the second closing member open and close the second seal opening; and a spring that presses the first closing member and the second closing member in a closing direction via the guide member.

In one preferable application of the fuel feeding device, the partition member has a through hole, which the guide member passes through, and the coupling mechanism further has a third gasket, which is attached to the guide member and seals periphery of the through hole, while the second closing member closes the second seal opening. In this structure, the third gasket effectively seals the periphery of the through hole, when the guide member moves along the through hole of the partition member. This arrangement desirably prevents the fuel vapor from leaking from the tank-side conduit section to the opening-side conduit section.

In another preferable embodiment of the present invention, the first shutter mechanism includes a first support arm that supports a lower face of the first closing member and rotates in a pivotal manner coaxially with the first closing member. The second shutter mechanism includes a second support arm that supports a lower face of the second closing member and rotates in a pivotal manner coaxially with the second closing member. The coupling mechanism transmits an opening and closing force of the first closing member via the first support arm and the second support arm. In this structure, the first support arm and the second support arm function to transmit the force to the coupling mechanism. This arrangement effectively prevents a large load from being directly applied from the fuel supply gun to the first closing member and the second closing member and protects the first and the closing members.

In one preferable application of the fuel feeding device of this embodiment, the coupling mechanism has: a first pinion gear that is arranged about a rotating shaft of the first support arm; a first rack gear that is formed on one end of a guide member to engage with the first pinion gear; a second pinion gear that is arranged about a rotating shaft of the second support arm; and a second rack gear that is formed on the other end of the guide member to engage with the second pinion gear. A pivotal rotation of the first support arm moves the guide member via the first pinion gear and the first rack gear, so as to pivotally rotate the second support arm via the second rack gear and the second pinion gear and open and close the second closing member.

In another preferable application of the present invention, the fuel feeding device has a dust cap that is detachably attached to an upper end of an inlet pipe and covers an upper area of the first seal opening. This arrangement uses a familiar cap like the conventional screwed cap and thereby prevents any confusion of the opening and closing action. The cap also protects the periphery of the first seal opening from dust.

In one preferable embodiment of the fuel feeding device, the first closing member is supported on an upper end of an inlet pipe in a pivotally rotatable manner and is arranged to open the first seal opening when one end of the first closing member is pulled up. The coupling mechanism is constructed as a linkage mechanism that converts a force of pulling up the first closing member into a force of pivotally rotating the second closing member.

In another preferable embodiment of the fuel feeding device, the first closing member has a pressure regulator for regulating pressure in the fuel tank. This arrangement enables the pressure in the fuel tank and the pressure in the fuel conduit to be kept in a range of not higher than a preset level.

In another preferable application of the present invention, the fuel feeding device further includes: a first gasket that is composed of a first sealing material and is interposed and seals between a periphery of the first seal opening and the first closing member; and a second gasket that is composed of a second sealing material and is interposed and seals between a periphery of the second seal opening and the second closing member. The first sealing material of the first gasket is different from the second sealing material of the second gasket.

The present invention is also directed to another fuel feeding device for a furl tank, which feeds a supply of fuel to the fuel tank through a fuel conduit of an inlet pipe. The fuel feeding device includes: a conduit forming member that defines the fuel conduit and has a first seat face, which faces the fuel conduit and is formed closer to an inlet opening of the fuel conduit, and a second seat face, which faces the fuel conduit and is formed closer to the fuel tank than the first seat face; a first closing member that is moved in a closing direction toward the first seat face; a first gasket that is composed of a first sealing material and is seated on the first seat face by a closing action of the first closing member; a second closing member that is moved in a closing direction toward the second seat face; and a second gasket that is composed of a second sealing material, which is different from the first sealing material, and is seated on the second seat face by a closing action of the second closing member.

In this fuel feeding device of the present invention, the first closing member presses the first gasket against the first seat face to seal the inlet opening of the fuel conduit. The second closing member presses the second gasket against the second seat face to seal the fuel conduit on the side of the fuel tank. This structure ensures double sealing of the fuel tank from the atmosphere.

The first gasket and the second gasket are composed of different sealing materials. The first sealing material and the second sealing material are selected appropriately according to their temperature characteristics, the positions of the gaskets, the frequencies of pressing by the first and the second closing members, and the conditions of receiving the compressive force and the torsional force.

It is preferable that the first gasket is composed of the material having better sealing properties at low temperatures than the material of the second gasket. The first sealing material may be any one of butadiene-acrylonitrile copolymer (NBR), alkyl-siloxane condensate (Q), and trifluoropropyl-methyl-siloxane condensate (FVMQ). The second sealing material may be either one of vinylidene fluoride-hexafluoropropylene copolymer (FKM) and hydrogenated butadiene acrylonitrile rubber (HNBR).

The second gasket has excellent sealing properties at ordinary temperature, and the first gasket compensates for the sealing properties at low temperatures. The fuel feeding device of this arrangement thus ensures the sufficiently high sealing properties in a wide temperature range.

BEST MODES OF CARRYING OUT THE INVENTION (1) First Embodiment

Figure 1:
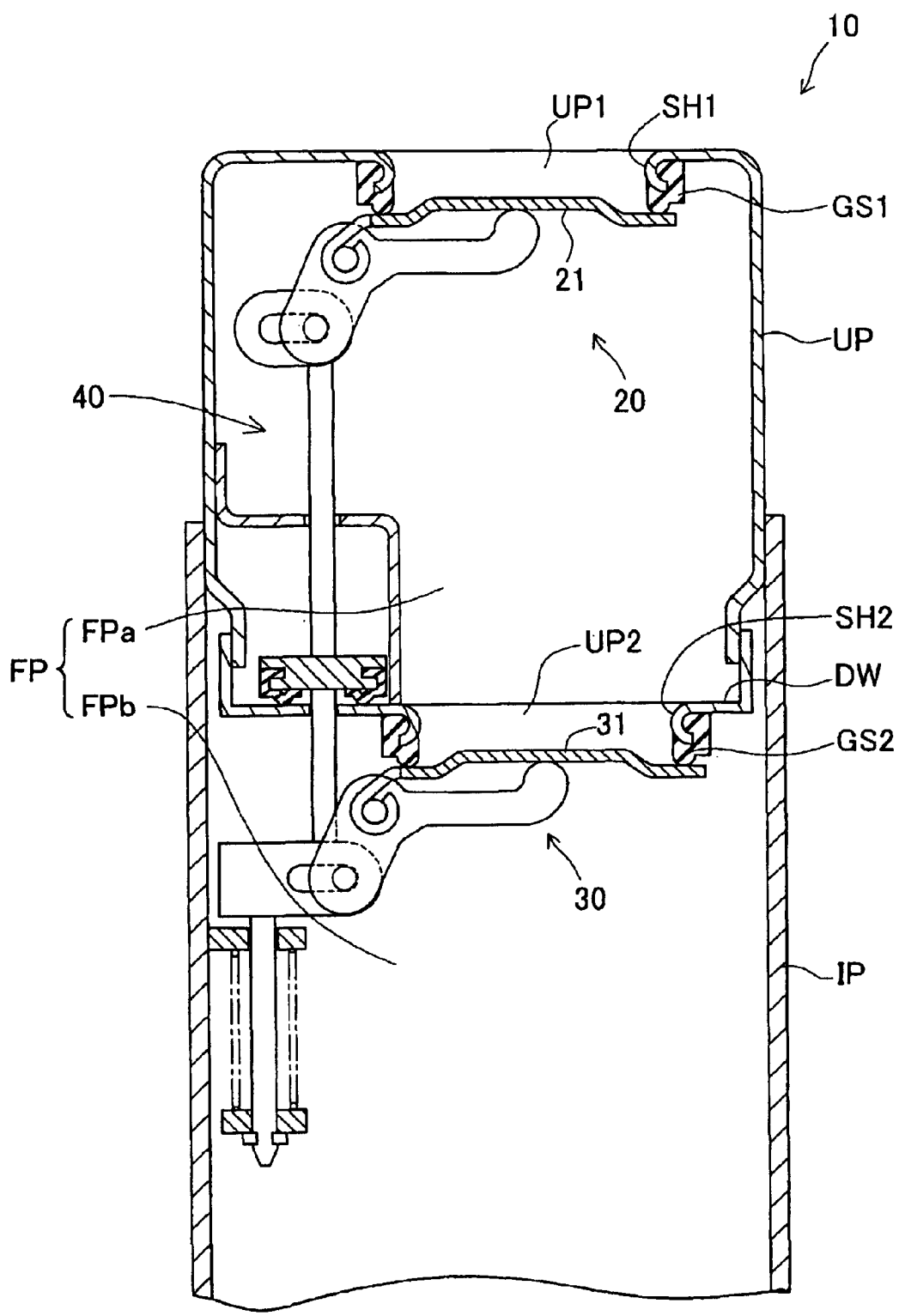
FIG. 1 is a sectional view illustrating a fuel feeding device for a fuel tank in a first embodiment of the present invention.

FIG. 1 is a sectional view illustrating a fuel feeding device 10 for a fuel tank of an automobile in a first embodiment of the present invention. As shown in FIG. 1, the fuel feeding device 10 has double shutter structure in an upper tubular member UP, which forms part of an inlet pipe IP. In the concrete structure, the fuel feeding device 10 includes the inlet pipe IP having a fuel conduit FP, a first seal opening UP1, and a second seal opening UP2, a first shutter mechanism 20 having a first closing member 21 to open and close the first seal opening UP1, a second shutter mechanism 30 having a second closing member 31 to open and close the second seal opening UP2, and a coupling mechanism 40 that guides the second closing member 31 to be opened and closed in conjunction with the opening and closing action of the first closing member 21.

The fuel feeding device 10 feeds a supply of fuel by means of insertion of a fuel supply gun (not shown) into the inlet pipe IP. The following describes the construction of the fuel feeding device 10.

The upper tubular member UP has the first seal opening UP1 on its upper end. A first seal support end SH1 is formed on the inner circumference of the first seal opening UP1. A first gasket GS1 is set on the first seal support end SH1. A partition member DW is fixed to the lower end of the upper tubular member UP. The partition member DW parts the upper tubular member UP into an opening-side conduit section FPa and a tank-side conduit section FPb. The partition member DW has the second seal opening UP2. A second seal support end SH2 is formed on the inner circumference of the second seal opening UP2. A second gasket GS2 is set on the second seal support end SH2. The first and the second seal openings UP1 and UP2 are thus opened and closed respectively by the first and the second shutter mechanisms 20 and 30, while being sealed with the first and the second gaskets GS1 and GS2.

Figure 2:
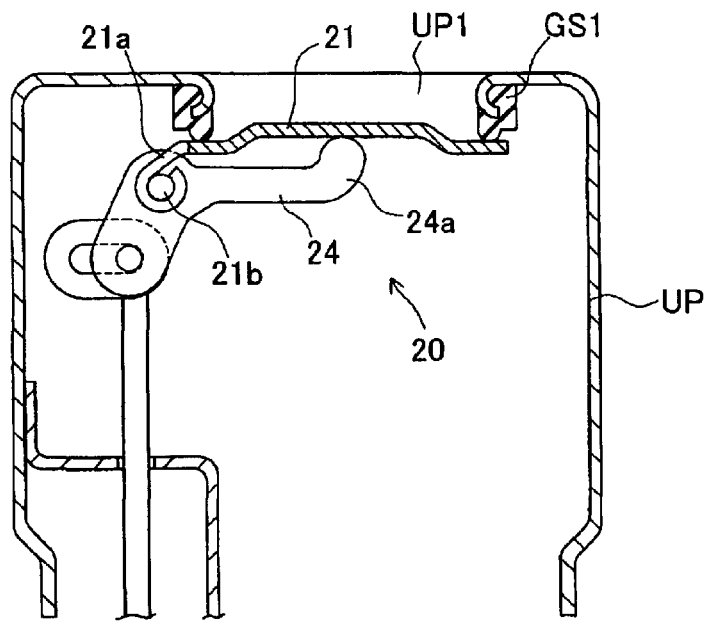
FIG. 2 is a sectional view illustrating the periphery of a first shutter mechanism.

FIG. 2 is a sectional view illustrating the periphery of the first shutter mechanism 20. As shown in FIG. 2, the first shutter mechanism 20 functions to open and close the first seal opening UP1, and includes the first closing member 21 and a first support arm 24. The first closing member 21 is supported in a pivotally movable manner by a first shaft 21*b* at a first pivotal end 21*a*. The lower face of the first closing member 21 is supported at a first support end 24*a* of the first support arm 24. The other end of the first support arm 24 is supported by the first shaft 21*b* in a pivotally movable manner. Namely both the first closing member 21 and the first support arm 24 are supported by the first shaft 21*b* in a pivotally movable manner.

Figure 3:
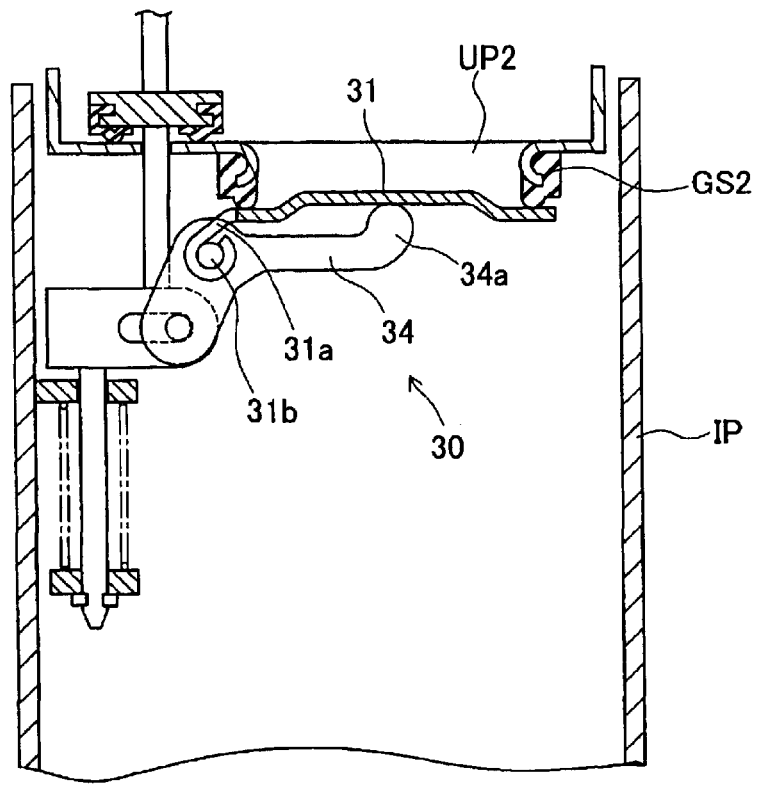
FIG. 3 is a sectional view illustrating the periphery of a second shutter mechanism.

FIG. 3 is a sectional view illustrating the periphery of the second shutter mechanism 20. As shown in FIG. 3, the second shutter mechanism 30 has a substantially similar structure to that of the first shutter mechanism 20, functions to open and close the second seal opening UP2, and includes the second closing member 31 and a second support arm 34. The second sealing member 31 is supported in a pivotally movable manner by a second shaft 31*b* at a second pivotal end 31*a*. The lower face of the second closing member 31 is supported at a second support end 34*a* of the second support arm 34. The other end of the second support arm 34 is also supported by the second shaft 31*b* in a pivotally movable manner.

Figure 4:
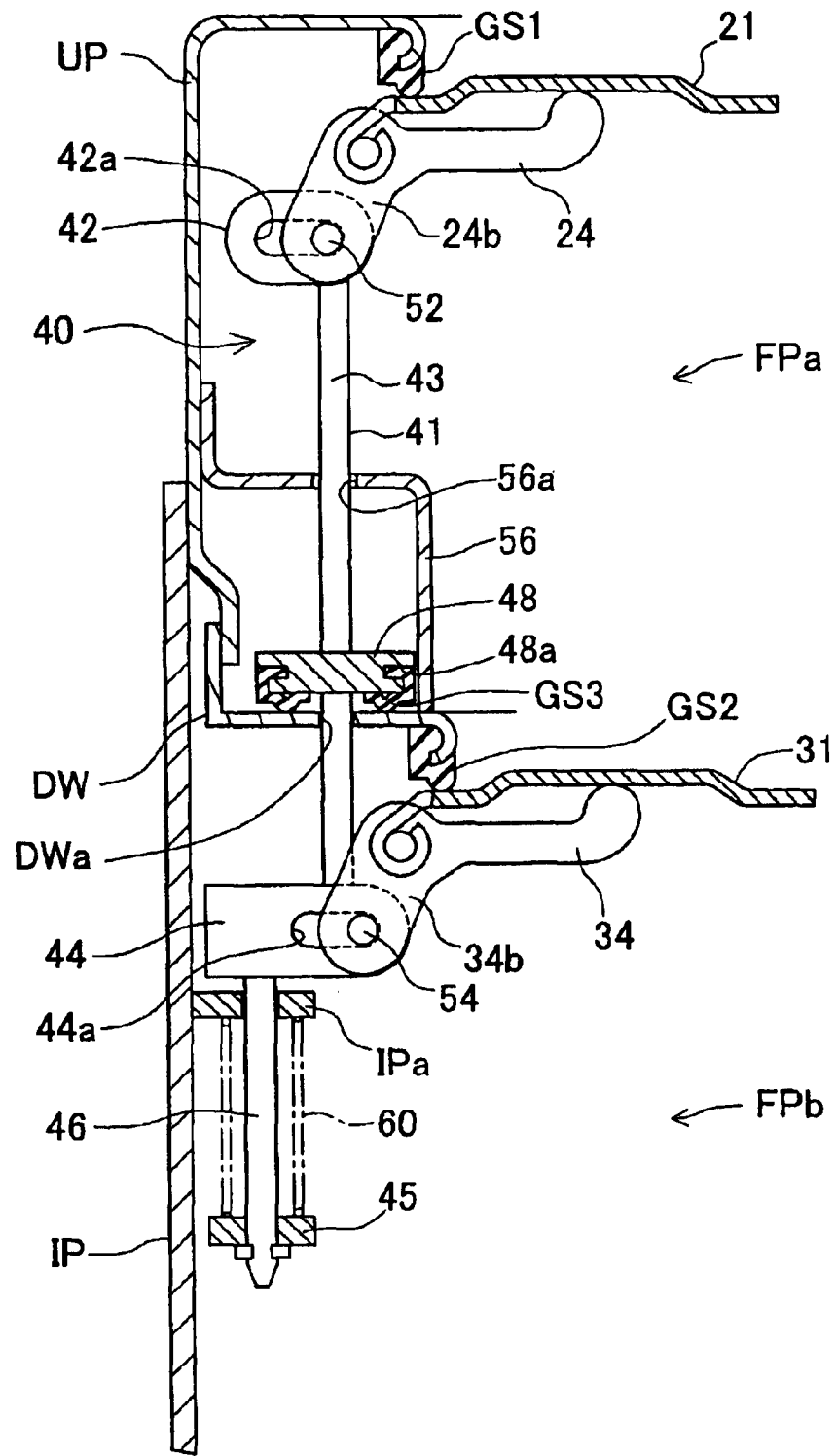
FIG. 4 is a sectional view illustrating the periphery of a coupling mechanism.

FIG. 4 is a sectional view illustrating the periphery of the coupling mechanism 40. As shown in FIG. 4, the coupling mechanism 40 guides the second closing member 31 to be opened and closed in conjunction with the opening and closing action of the first closing member 21. The coupling mechanism 40 includes a guide member 41, a first joint pin 52, a second joint pin 54, and a spring 60 set on the lower portion of the guide member 41.

The guide member 41 has a first guide plate 42, an upper guide shaft 43 extended downward from the lower end of the first guide plate 42, a second guide plate 44 located below the upper guide shaft 43, and a lower guide shaft 46 extended downward from the lower end of the second guide plate 44. These elements are integrated to form the guide member 41.

A first guide slot 42*a* is formed in the first guide plate 42. The first joint pin 52 is received in the first guide slot 42*a* in a freely slidable manner. In this structure, the first guide plate 42 is linked with a first joint piece 24*b* of the first support arm 24.

The upper guide shaft 43 passes through a through hole 56*a* of a support member 56 fixed to the upper tubular member UP, and then passes through a through hole DWa of the partition member DW to be held relative to the upper tubular member UP. The upper guide shaft 43 has a seal support element 48 with a receiving recess 48*a*. A third gasket GS3 is fit in the receiving recess 48*a* and is accordingly held by the seal support element 48. While the upper guide shaft 43 is located in the lower position (in the state of FIG. 4), the third gasket GS3 is seated on the upper face of the outer circumference including the through hole DWa to seal the tank-side conduit section FPb against the opening-side conduit section FPa.

A second guide slot 44*a* is formed in the second guide plate 44. The second joint pin 54 is received in the second guide slot 44*a* in a freely slidable manner. The second guide plate 44 is linked with a second joint piece 34*b* of the second support arm 34.

A stopper 45 is fastened to the lower end of the lower guide shaft 46. The spring 60 is spanned between the stopper 45 and a spring support end IPa projected from the inner wall of the inlet pipe IP. The pressing force of the spring 60 is transmitted via the guide member 41 to make the first support arm 24 press the first closing member 21 against the first gasket GS1 and to make the second support arm 34 press the second closing member 31 against the second gasket GS2.

Figure 5:
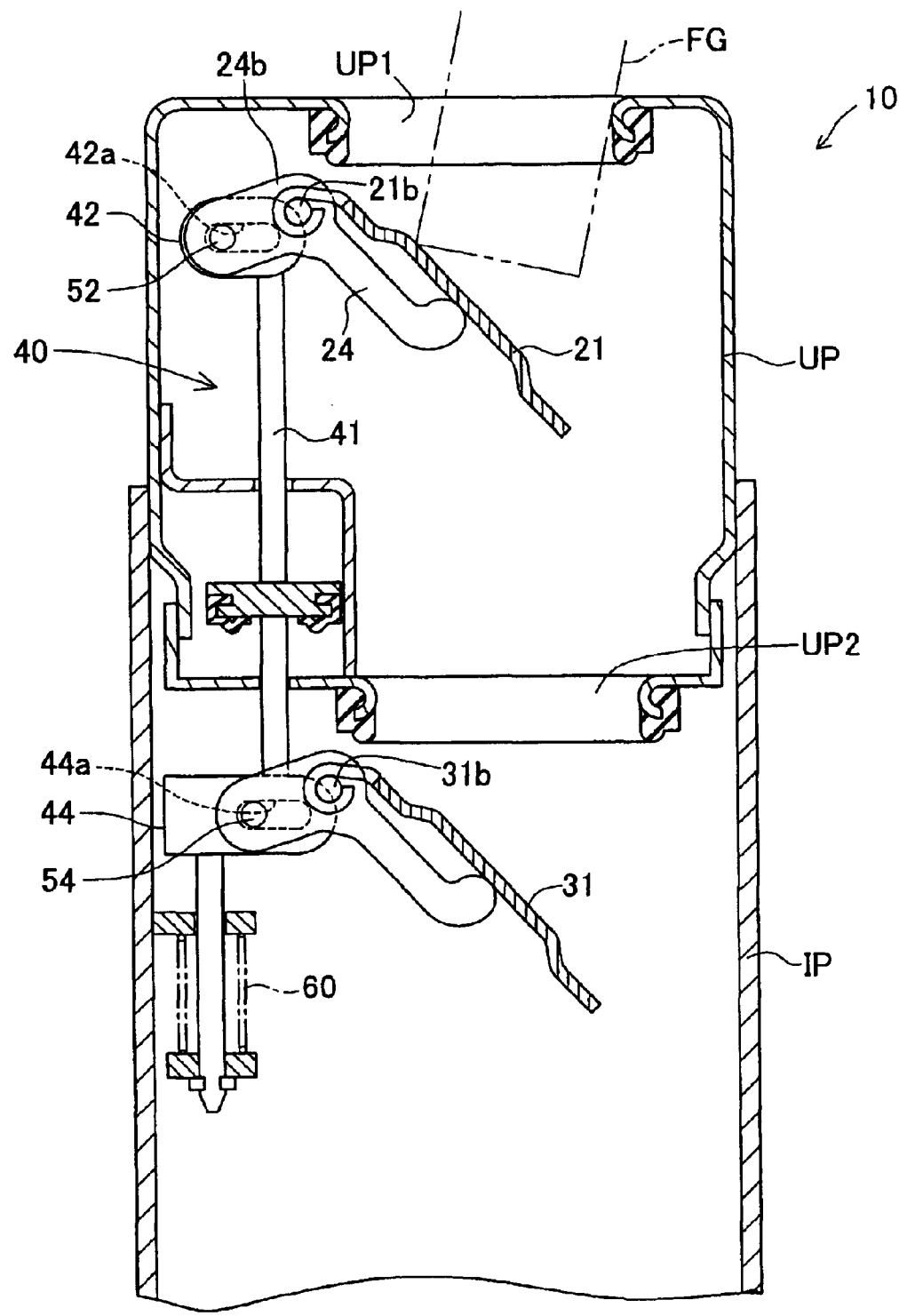
FIG. 5 shows one phase in a fuel supply process with the fuel feeding device of the first embodiment.
Figure 6:
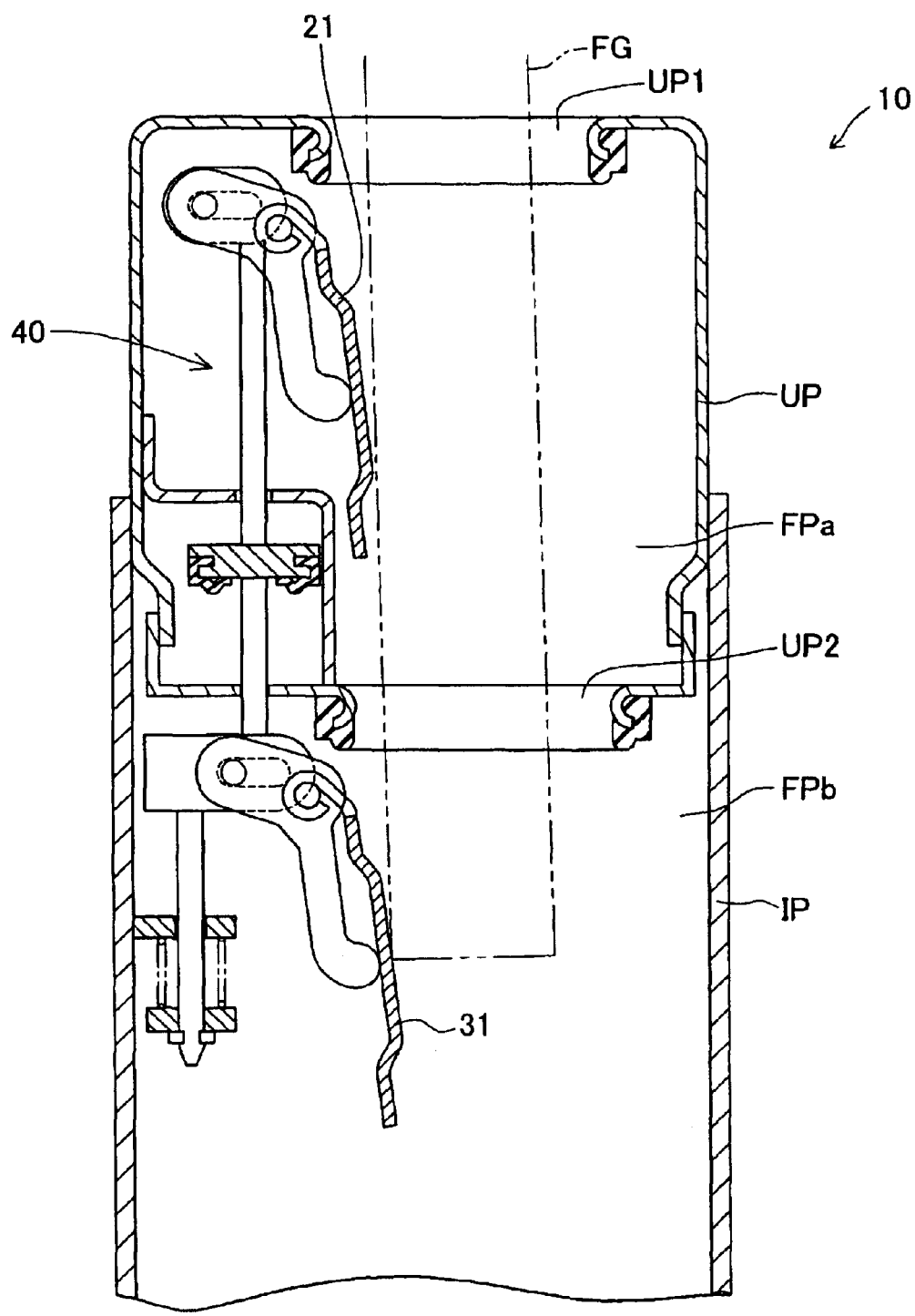
FIG. 6 shows another phase in the fuel supply process subsequent to FIG. 5.

The opening and closing action of the fuel feeding device 10 is discussed below. When the fuel is supplied from the fuel feeding device 10 in the state of FIG. 1 to the fuel tank, the fuel supply gun is first inserted through the first seal opening UP1 as shown in FIG. 5. The end of the fuel supply gun FG presses the first closing member 21, which then pivotally rotates clockwise about the first shaft 21*b* . The pivotal rotation of the first closing member 21 results in pivotally rotating the first support arm 24 in the same direction. This sets the first closing member 21 in the open position.

With the pivotal rotation of the first support arm 24, the first joint pin 52 held by the first linkage piece 24*b* slides in the first guide slot 42*a* and pulls up the guide member 41. At this moment, the guide member 41 is pulled up against the pressing force of the spring 60. In conjunction with the pull-up action of the guide member 41, the second joint pin 54 slides in the second guide slot 44*a* formed in the second guide plate 44 and moves slightly upward to pivotally rotate the second support arm 34 and the second closing member 34 about the second shaft 31*b*. This movement opens the second seal opening UP2. When the fuel supply gun presses the first closing member 21 to open the first seal opening UP1, this action is transmitted via the coupling mechanism 40 to press the second sealing member 31 and open the second seal opening UP2. The supply of fuel is accordingly fed from the fuel supply gun FG.

On completion of the fuel supply, the fuel supply gun FG is drawn out of the first seal opening UP1 and the second seal opening UP2. The pressing force of the spring 60 then moves the guide member 41 downward. The downward moving force of the guide member 41 pivotally rotates the first closing member 21 counterclockwise via the first joint pin 52 and the first support arm 24, while pivotally rotating the second closing member 31 counterclockwise via the second joint pin 54 and the second support arm 34. The first closing member 21 thus pivotally rotates counter clockwise to close the first seal opening UP1, and simultaneously the second closing member 31 pivotally rotates counter clockwise to close the second seal opening UP2. In this manner, the second closing member 31 is opened and closed in conjunction with the movement of the first closing member 21 that receives the force from the fuel supply gun.

In the fuel feeding device 10 of the above structure, the fuel tank and the outside are double sealed with the first shutter mechanism 20 and the second shutter mechanism 30, so as to reduce the emission of the fuel vapor in the fuel tank.

When the fuel supply gun FG presses the first closing member 21, the pressing force is transmitted via the coupling mechanism 40 to the second closing member 31 to open the second seal opening UP2. This structure does not receive a large load from the fuel supply gun FG and is thus substantially trouble free.

The fuel supply is readily carried out by only inserting and drawing the fuel supply gun FG into and out of the inlet pipe IP through the first seal opening UP1.

As shown in FIG. 4, even when the guide member 41 passing through the through hole DWa of the partition member DW slides therein, the third gasket GS3 seals the periphery of the through hole DWa and effectively prevents the fuel vapor from being leaked from the tank-side conduit section FPb to the opening-side conduit section FPa.

Since the first closing member 21 and the second closing member 31 are attached to the inlet pipe IP, while the conventional screw-type fuel cap should be placed aside during the fuel supply, the structure of the embodiment is free from such a trouble.

(2) Second Embodiment

Figure 7:
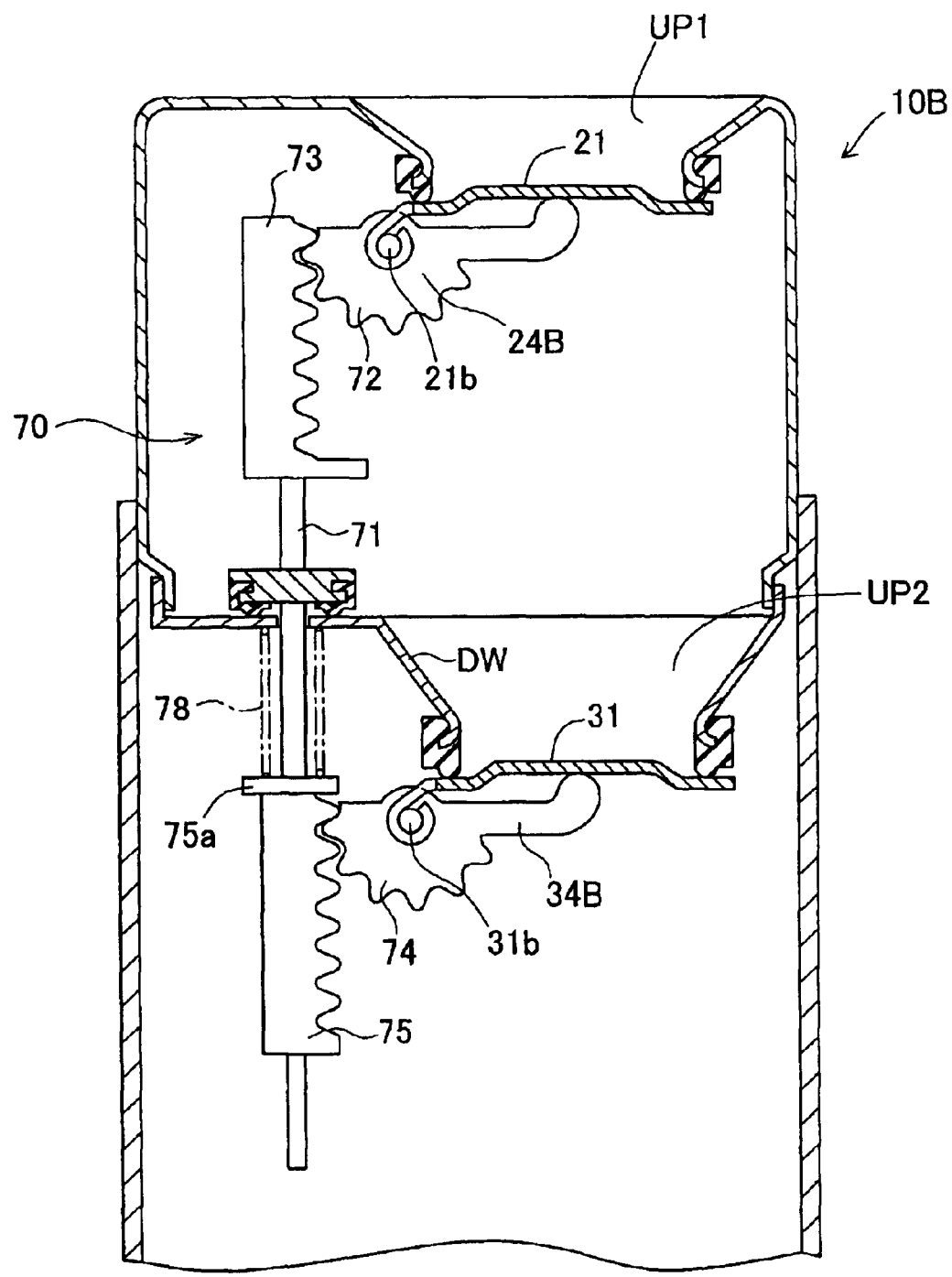
FIG. 7 is a sectional view illustrating a fuel feeding device for a fuel tank in a second embodiment.
Figure 8:
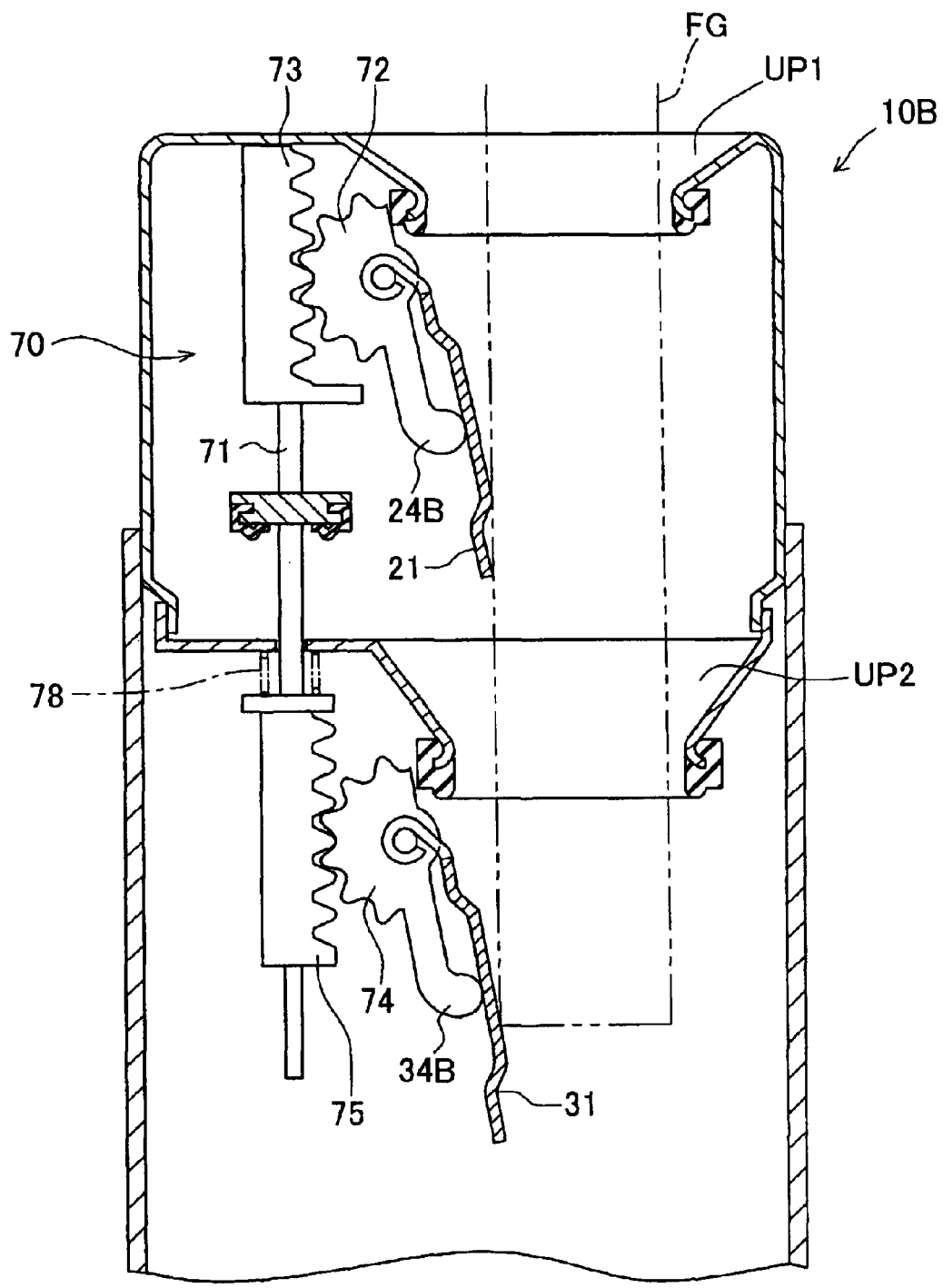
FIG. 8 shows a fuel supply process with the fuel feeding device of the second embodiment.

FIGS. 7 and 8 are sectional views illustrating another fuel feeding device 10B in a second embodiment. The second embodiment is characterized by a coupling mechanism 70 of a rack and a pinion structure.

Referring to FIG. 7, the coupling mechanism 70 includes a guide member 71, a first pinion gear 72 formed on a first support arm 24B, a first rack gear 73 disposed above the guide member 71, a second pinion gear 74 formed on a second support arm 34B, a second rack gear 75 disposed below the guide member 71, and a spring 78.

The first pinion gear 72 is formed half around a first shaft 21b of the first support arm 24B and engages with the first rack gear 73 to move the guide member 71 up and down with the pivotal rotation of the first support arm 24B. The second pinion gear 74 is formed half around a second shaft 31b of the second support arm 34B and engages with the second rack gear 75 to pivotally rotate the second support arm 34B with the elevating motion of the guide member 71. The spring 78 is spanned between the lower face of a partition member DW and a flange 75a on the upper end of the second rack gear 75 and presses down the guide member 71.

When the first supply gun FG presses the first closing member 21 in the state of FIG. 7 and causes the first closing member 21 to pivotally rotate with the first support arm 24B clockwise as shown in FIG. 8, the guide member 71 moves upward via the first pinion gear 72 and the first rack gear 73. The upward movement of the guide member 71 causes the second support arm 34B to pivotally rotate clockwise via the second rack gear 75 and the second pinion gear 74. The second closing member 31 with the second support arm 34B accordingly opens the second seal opening UP2.

When the fuel supply gun FG in the state of FIG. 8 is drawn out of the first seal opening UP1 and the second seal opening UP2, the load applied to the first support arm 24B is released. The pressing force of the spring 78 then moves the guide member 71 down. The downward movement makes the first closing member 21 close the first seal opening UP1, while making the second closing member 31 close the second seal opening UP2.

Like the coupling mechanism 70 of the second embodiment, the simple rack and pinion structure that converts the rotational movement to the linear movement enables the second closing member 31 to be opened and closed in conjunction with the opening and closing action of the first closing member 21.

(3) Third Embodiment

Figure 9:
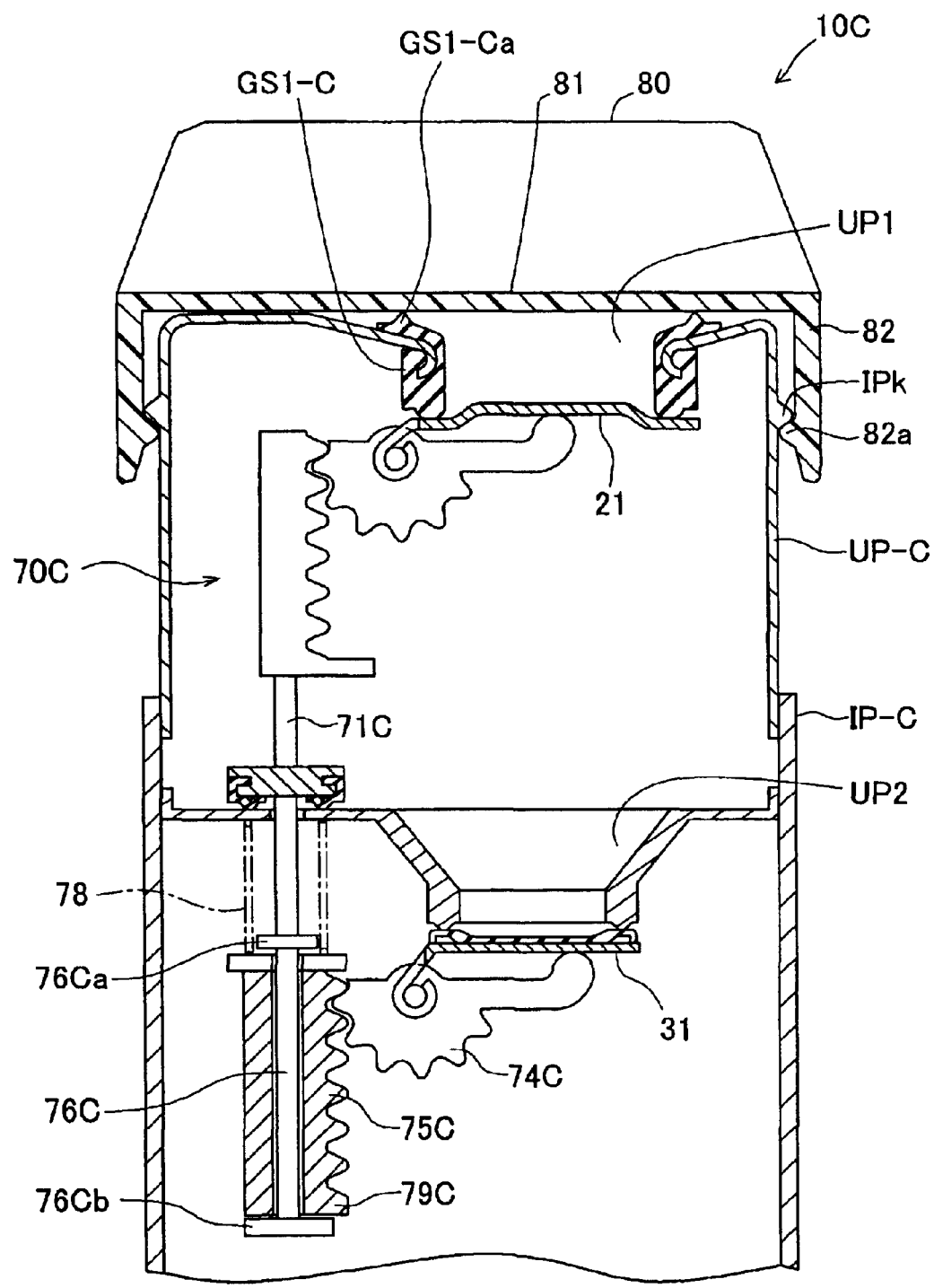
FIG. 9 is a sectional view illustrating a fuel feeding device in a third embodiment.
Figure 10:
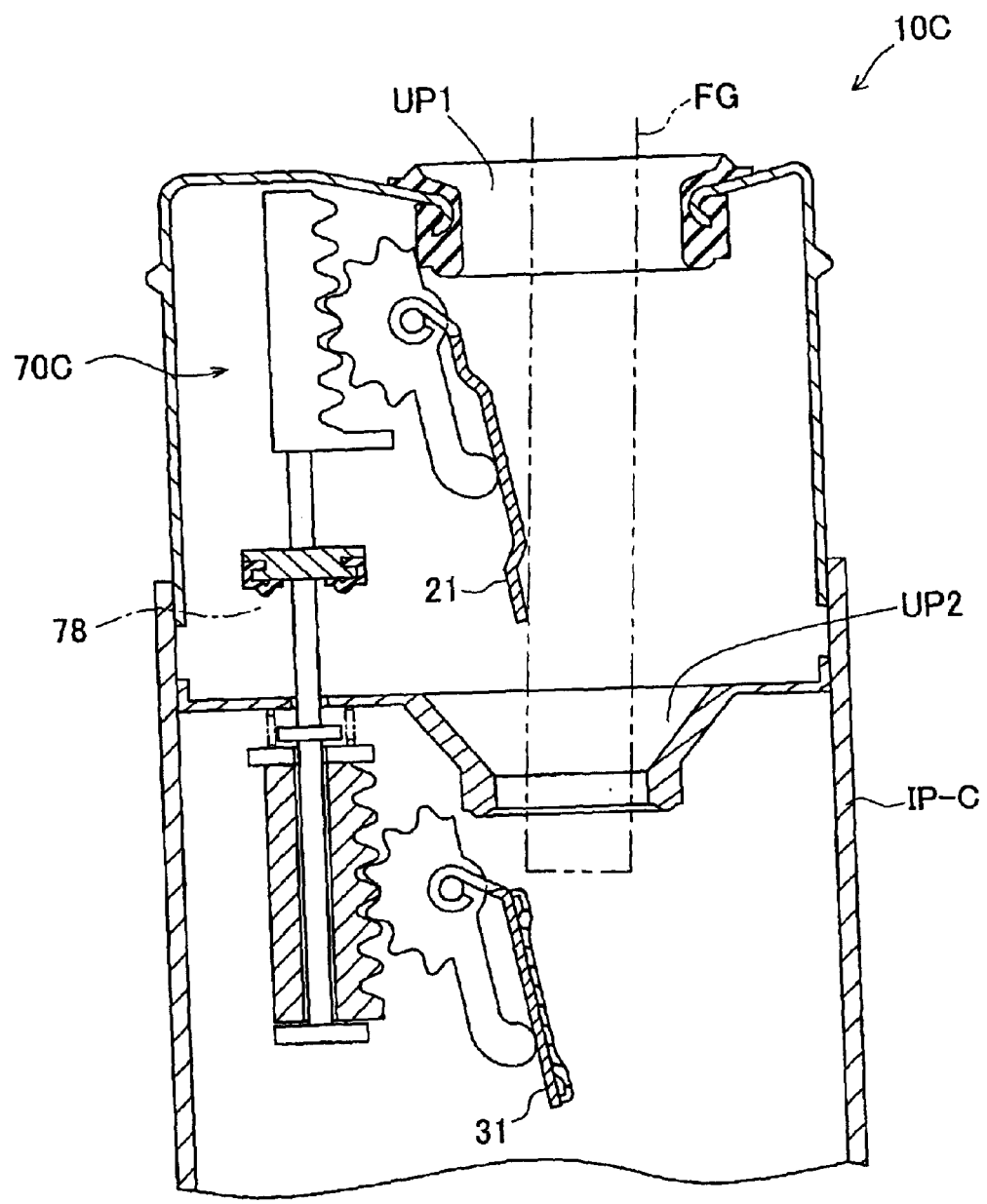
FIG. 10 shows a fuel supply process with the fuel feeding device of the third embodiment.

FIGS. 9 and 10 are sectional views illustrating a fuel feeding device 10C in a third embodiment. The third embodiment is characterized by a coupling mechanism 70C of a rack and pinion structure and a cap 80.

Referring to FIG. 9, a cap 80 covers the first seal opening UP1 on the upper end of an inlet pipe IP-C. The cap 80 has a side wall 82 extended from an upper wall 81. The cap 80 is attached to and detached from the inlet pipe IP-C, as an engagement projection 82a projected inward from the side wall 82 engages with and disengages from a single thread IPk projected on the upper outer circumference of an upper tubular member UP-C. The lower face of the cap 80 is formed to press a first gasket GS1-C and seal the first seal opening UP1. The first gasket GS1-C has a seal projection GS1-Ca on the upper end thereof. The seal projection GS1-Ca presses the lower face of the cap 80 to attain sealing. The sealing between the lower face of the cap 80 and the first gasket GS1-C is effectuated, in addition to the sealing by the first closing member 21 and the sealing by the second closing member 31.

This triple sealing structure ensures the excellent sealing properties. The cap 80 has a similar shape to that of the conventional fuel cap and does not make any confusion in the fuel supply operation.

The coupling mechanism 70C is characterized by a tubular rack body 79C with a second rack gear 75C set outside a lower guide shaft 76C below a guide member 71C. The tubular rack body 79C is set around the lower guide shaft 76C to be slightly movable in the vertical direction, while flanges 76Ca and 76Cb attached to the lower guide shaft 76C restrict the vertical movement. The tubular rack body 79C set around the lower guide shaft 76C effectively absorbs the dimensional tolerance arising between the second rack gear 75C and a second pinion gear 74C.

In the fuel feeding device 10C, the fuel supply operation first removes the cap 80 and then inserts the fuel supply gun FG to open the first closing member 21 and the second closing member 31 via the coupling mechanism 70C as shown in FIG. 10.

(4) Fourth Embodiment

Figure 11:
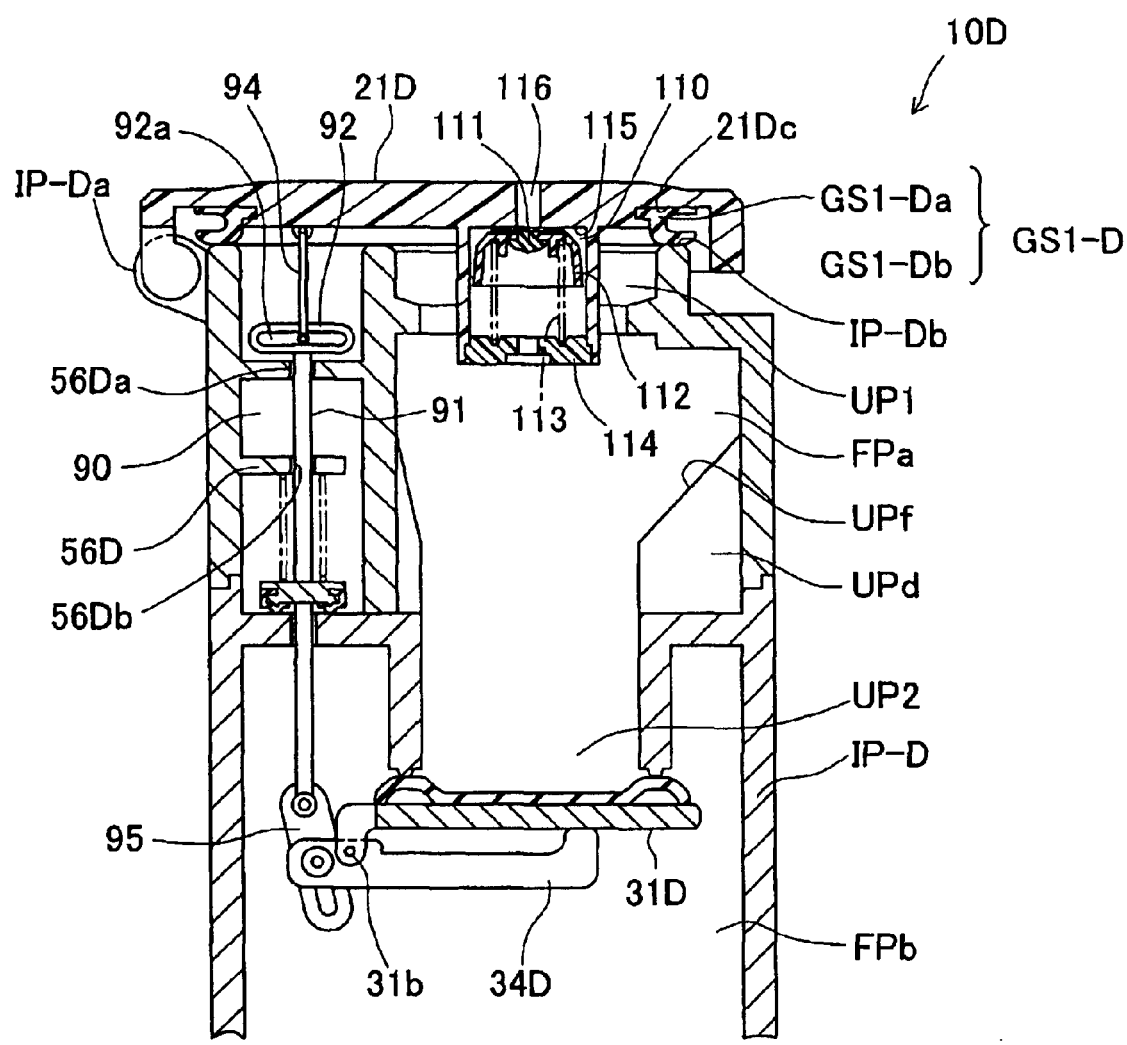
FIG. 11 is a sectional view illustrating a fuel feeding device in a fourth embodiment.
Figure 12:
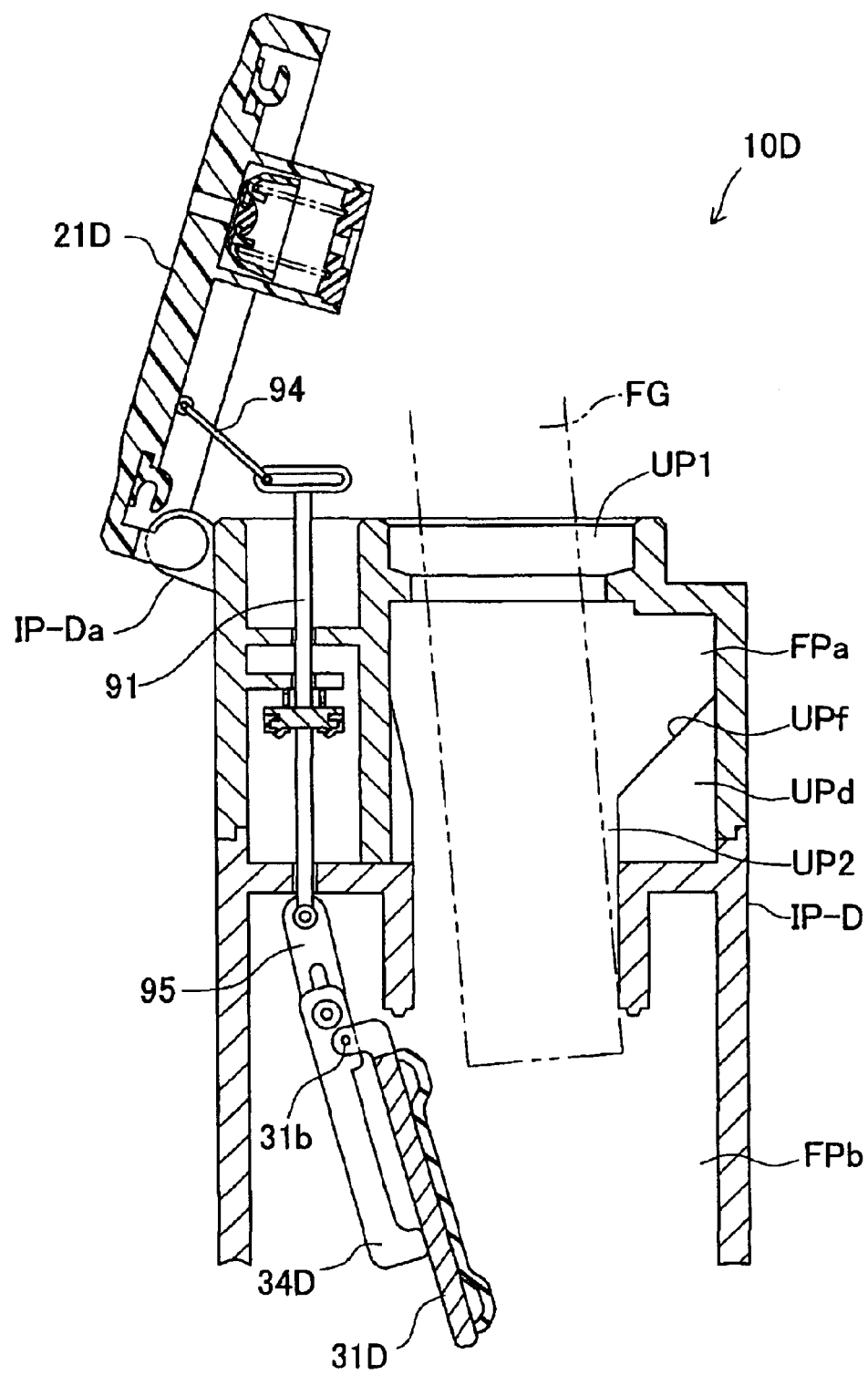
FIG. 12 shows a fuel supply process with the fuel feeding device of the fourth embodiment.

FIGS. 11 and 12 are sectional views illustrating a fuel feeding device 10D in a fourth embodiment. The fourth embodiment is characterized by the structure of manually opening and closing a first closing member 21D and the structure of a coupling mechanism 90.

Referring to FIG. 11, the first closing member 21D is supported in a pivotally rotatable manner on the top of an inlet pipe IP-D via a hinge ID-Da. The first closing member 21D is constructed, such that a pull-up action of the other end thereof opposite to the hinge ID-Da opens the first seal opening UP1. A ring-shaped seal receiving recess 21Dc is formed on the lower face of the first closing member 21D to receive a first gasket GS1-D therein. The first gasket GS1-D is an integral rubber body including a thin ring-shaped seal base GS1-Da and an elastic sealing element GS1-Db protruded from the seal base GS1-Da to have an L-shaped cross section. The closing action of the first closing member 21D causes the elastic sealing element GS1-Db to be seated on a first seat face IP-Db formed on the top of the inlet pipe IP-D.

The coupling mechanism 90 is constructed as a linkage mechanism to transmit the pivotal rotating force of the first closing member 21D to a second closing member 31D. The linkage mechanism includes a guide member 91, an upper link member 94 that links the first closing member 21D with the upper portion of the guide member 91, and a lower link member 95 that links the lower portion of the guide member 91 with a second support arm 34D.

The guide member 91 penetrates through holes 56Da and 56Db formed in a support member 56D disposed in the opening-side conduit section FPa and is thereby supported by the support member 56D. The guide member 91 has a first guide plate 92 with a first guide slot 92a on the upper portion thereof. The upper end of the upper link member 94 is supported on the lower surface of the first closing member 21D in a pivotally movable manner. The lower end of the upper link member 94 is received in the first guide slot 92a in a slidable manner. One end of the lower link member 95 is held on the lower end of the guide member 91 in a pivotally rotatable manner, whereas the other end of the lower link member 95 is held on one end of the second support arm 34D in a pivotally rotatable manner.

In the coupling mechanism 90 of the above structure, when the end of the first closing member 21D is pulled up and pivotally rotated about the hinge IP-Da as shown in FIG. 12, the guide member 91 and the lower link member 95 are drawn up via the upper link member 94. The second support arm 34D and the second closing member 31D then pivotally rotate clockwise about the second shaft 31b to open the second seal opening UP2. The coupling mechanism 90 constructed as the linkage mechanism as discussed above enables the second closing member 31D to be opened and closed in conjunction with the opening and closing action of the first closing member 21D.

Referring back to FIG. 11, a guide projection UPd is formed on the inner wall of the inlet pipe IP-D. The guide projection UPd is protruded toward the center of the opening-side conduit section Fpa, and has a guide plane UPf that is formed on the inner wall thereof to guide the fuel supply gun to the second seal opening UP2.

A negative pressure valve 110 (pressure regulator) is attached to the bottom face of the first closing member 21D to regulate the pressure in the fuel tank. The negative pressure valve 110 has a rubber valve disc 111, a valve supporting member 112 for supporting the valve disc 111, a spring 113, and a spring supporting member 114. The valve disc 111 is a rubber circular disc and is seated on and released from a seat plane 115 to open and close a communicating aperture 116. The structure of the negative pressure valve 110 lowers the inner pressure of the fuel tank. The valve disc 111 opens when the differential pressure between the lowered inner pressure of the fuel tank and the atmospheric pressure applied to the valve disc 111 exceeds the pressing force of the spring 113, and otherwise closes. In this manner, the negative pressure valve 110 keeps the inner pressure of the fuel tank to be not lower than a preset level.

(5) Fifth Embodiment

Figure 13:
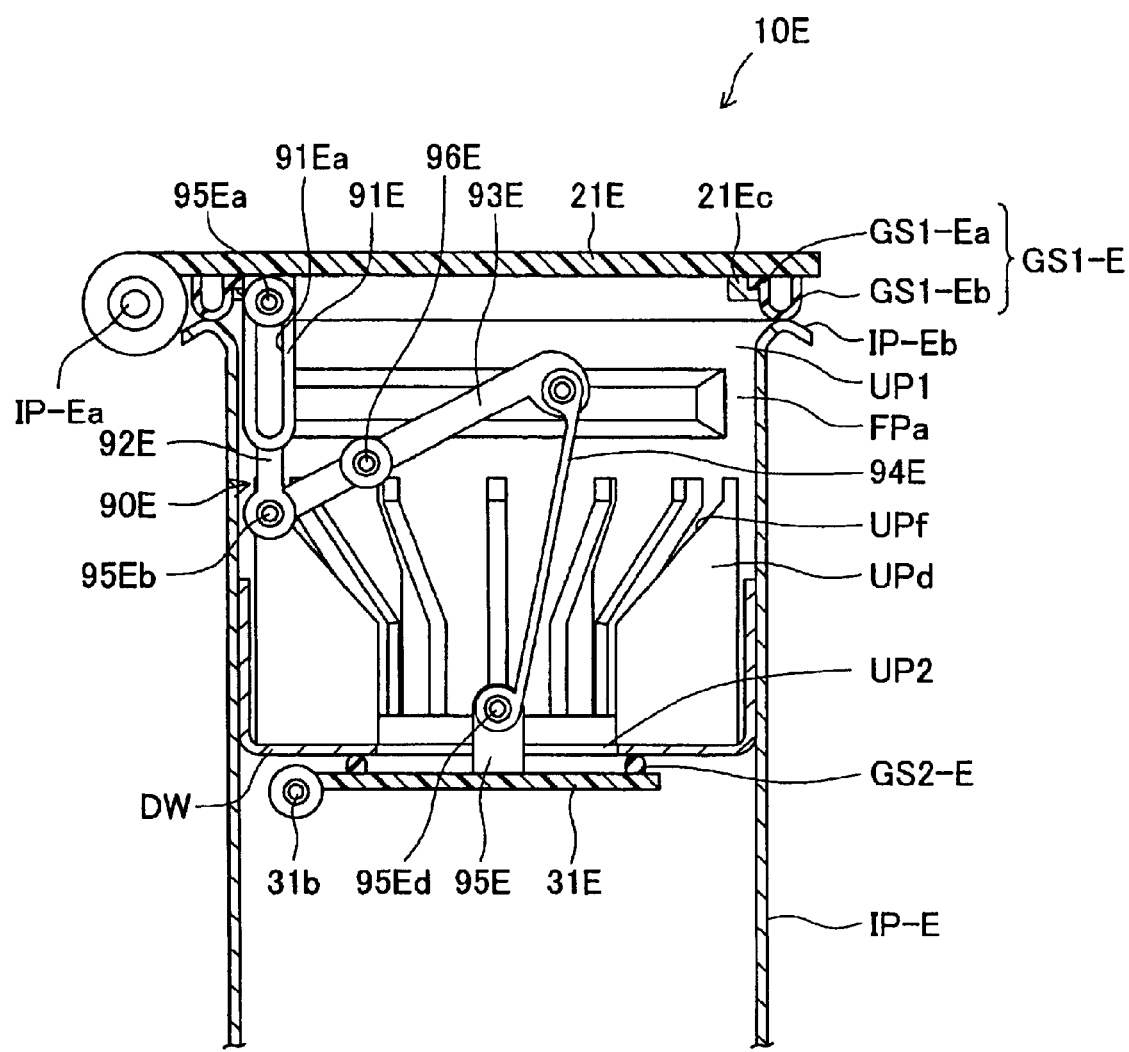
FIG. 13 is a sectional view illustrating a fuel feeding device 10E in a fifth embodiment.
Figure 14:
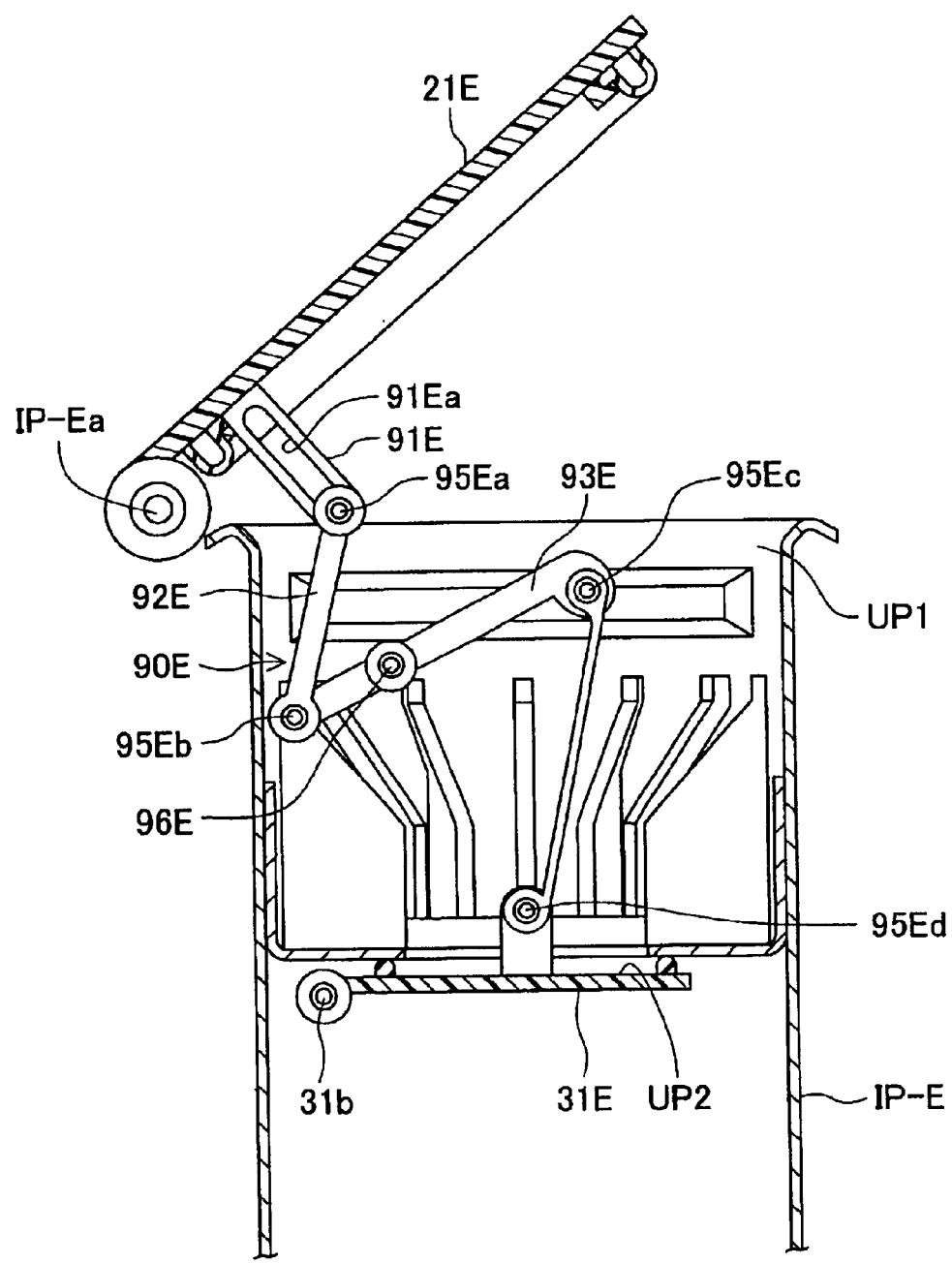
FIG. 14 shows one phase in a fuel supply process with the fuel feeding device 10E of the fifth embodiment.
Figure 15:
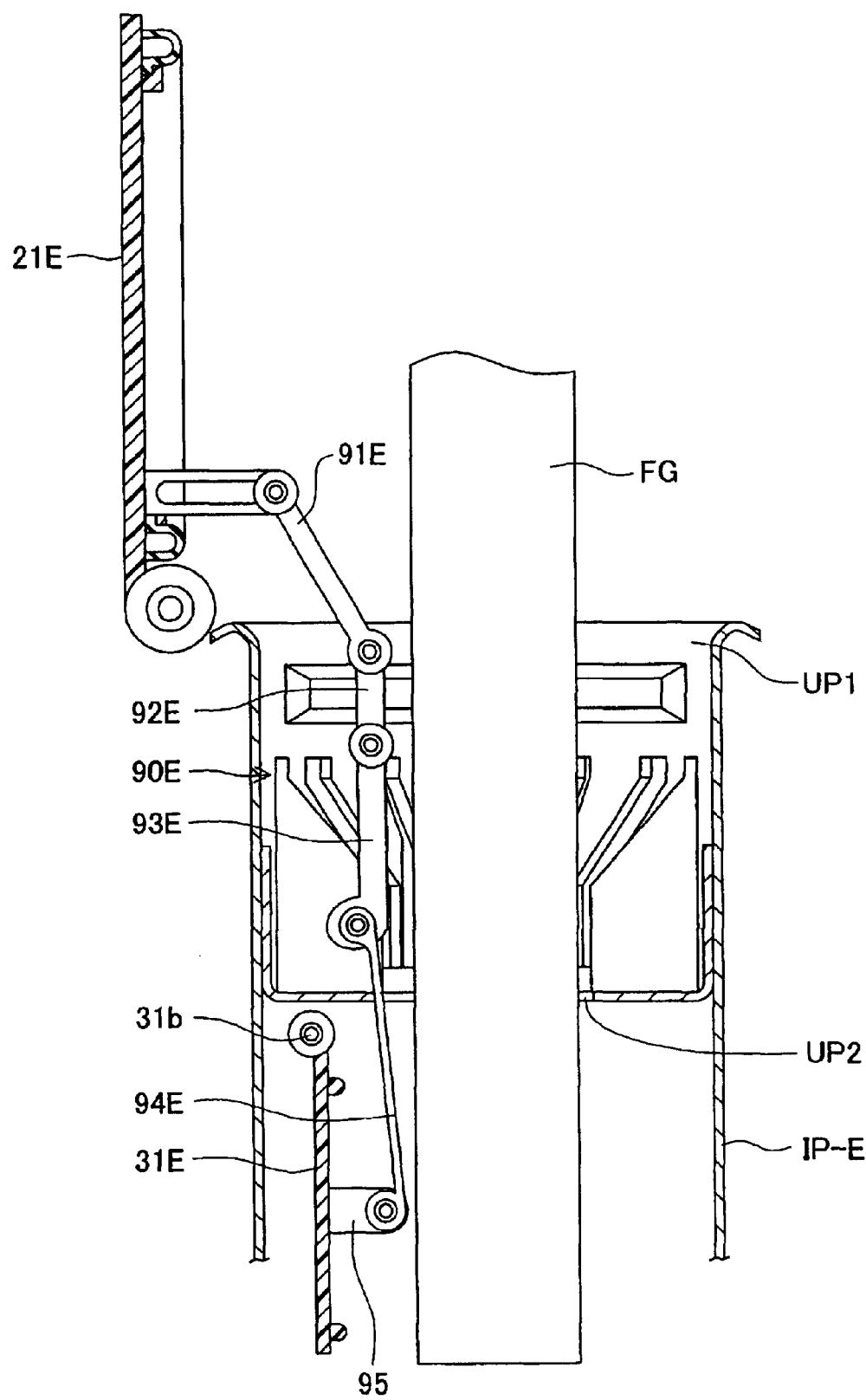
FIG. 15 shows another phase in the fuel supply process subsequent to FIG. 14.

FIGS. 13 through 15 are sectional views illustrating a fuel feeding device 10E in a fifth embodiment. The fifth embodiment is characterized by the simple sealing structure of a coupling mechanism 90E.

Referring to FIG. 13, a first closing member 21E is supported in a pivotally rotatable manner on the top of an inlet pipe IP-E via a hinge IP-Ea. The first closing member 21E is constructed, such that a pull-up action of the other end thereof opposite to the hinge IP-Ea opens the first seal opening UP1. A ring-shaped seal holding projection 21Ec is formed on the bottom face of the first closing member 21E. The outer circumference of the seal holding projection 21Ec holds a first gasket GS1-E. The first gasket GS1-E has a seal base GS1-Ea that engages with and is supported by the seal holding projection 21Ec, and an elastic sealing element GS1-Eb that is formed integrally with the seal base GS1-Ea and has a semicircular cross section and a ring-shaped hollow. The closing action of the first closing member 21E causes the elastic sealing element GS1-Eb to be seated on a first seat face IP-Eb formed on the top of the inlet pipe IP-E. The elastic sealing element GS1-Eb has the ring-shaped hollow and follows and comes into close contact with the curved first seat face IP-Eb to attain the high sealing properties.

The coupling mechanism 90E is constructed as a linkage mechanism to transmit the pivotal rotating force of the first closing member 21E to a second closing member 31E. The coupling mechanism 90E has a first guide member 91E, a first link 92E, a second link 93E, a third link 94E, and a second guide member 95E. The first guide member 91E is disposed at a right angle on the bottom face of the first closing member 21E, and has a first guide slot 91Ea. The second guide member 95E is disposed at a right angle on the top face of the second closing member 31E.

These guide members and links are coupled with one another by means of pins in a pivotally rotatable manner. The first guide member 91E is coupled with the first link 92E by means of a first pin 95Ea. The first pin 95Ea is slidable along the first guide slot 91Ea. The first link 92E is coupler with the second link 93E by means of a second pin 95Eb in a pivotally rotatable manner. The second link 93E is coupled with the third link 94E by means of a third pin 95Ec. The third link 94E is coupled with the second guide member 95E by means of a fourth pin 95Ed. The second 93E is supported by a support shaft 96E in a pivotally rotatable manner. The support shaft 96E is fixed to the inlet pipe IP-E.

In the coupling mechanism 90E of the above structure, when the end of the first closing member 21E is pulled up with fingers as shown in FIG. 14, the first closing member 21E is pivotally rotated about the hinge IP-Ea to open the first seal opening UPS. At this moment, the first pin 95Ea slides along the first guide slot 91Ea, so that substantially no force is transmitted from the first guide member 91E to the first link 92E. This structure requires only a little pull-up force at the end of the first closing member 21 E. The action of slightly opening the first closing member 21E with fingers is then readily converted to a sufficiently large force to fully open the first closing member 21E.

When the first pin 95Ea reaches the lower end of the first guide slot 91Ea, the first link 92E is drawn up. With the draw-up action of the first link 92E, the second link 93E pivotally rotates clockwise about the support shaft 96E. The pivotal rotation presses down the other end of the second link 93E and moves the third link 94E down. The downward movement of the third link 94E causes the second closing member 31E to pivotally rotate about the second shaft 31b and open the second seal opening UP2 (the state of FIG. 15). The coupling mechanism 90E of this structure enables the second closing member 31E to be opened and closed in conjunction with the opening-closing action of the first closing member 21E. The first through the fourth links 92E to 94E of the coupling mechanism 90E are substantially aligned on one side of the fuel conduit FP and thereby do not interfere with smooth insertion of the fuel supply gun FG into the fuel conduit FP.

Referring back to FIG. 13, multiple guide projections UPd are formed on the inner wall of the inlet pipe IP-E. Each of the multiple guide projections UPd is protruded toward the center of the opening-side conduit section FPa and has a guide face UPf formed on the inner wall thereof to guide the fuel supply gun to the second seal opening UP2. The guide projections UPd are extended to a certain length to receive the second link 93E in a space defined thereby at the opening position of the first closing member 21E. The fuel supply gun FG inserted into the opening-side conduit section FPa does not come into contact with the second link 93E nor damage the coupling mechanism 90E.

In the structure of the coupling mechanism 90E, the fourth link 94E does not pass through the partition member DW, but directly moves the second closing member 31E to open and close the second seal opening UP2. This structure does not require any gasket between the link and the through hole of the partition member DW, thus desirably enhancing the sealing properties and reducing the number of parts.

(6) Sixth Embodiment

Figure 16:
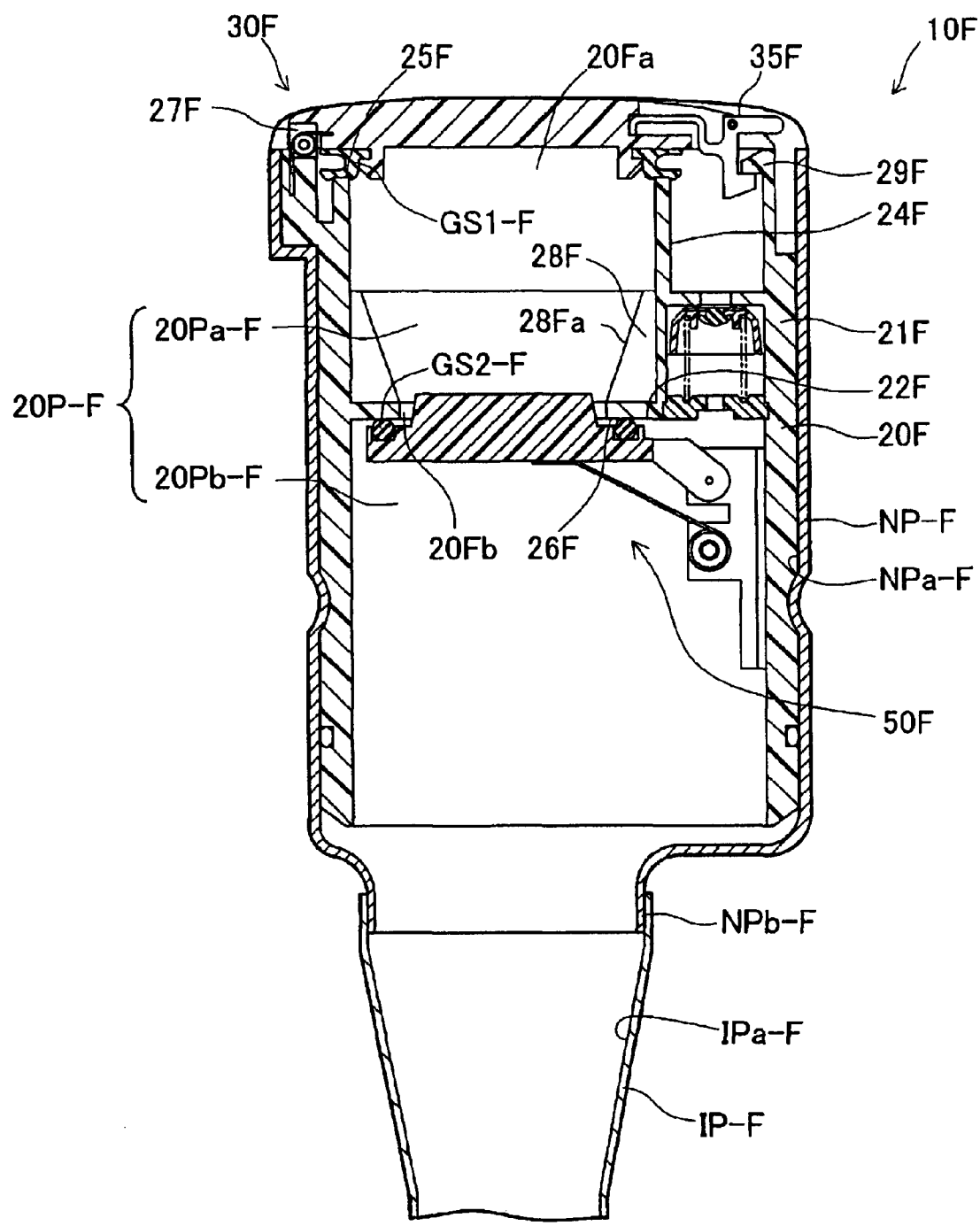
FIG. 16 is a sectional view illustrating a fuel feeding device for a fuel tank in a sixth embodiment.

FIG. 16 is a sectional view illustrating a fuel feeding device 10F for a fuel tank in a sixth embodiment. The fuel feeding device 10F is attached to an inlet pipe IP-F to feed a supply of fuel to a fuel tank (not shown). The fuel feeding device 10F includes a neck pipe NP-F that is fixed to the top of the inlet pipe IP-F, a casing main body 20F (conduit forming member) that is fit in the neck pipe NP-F to define a fuel conduit 20P-F, a first closing mechanism 30F that opens and closes an inlet opening 20Fa formed on the top of the casing main body 20F, a second closing mechanism 50F that opens and closes a seal opening 20Fb or a narrowed section of the fuel conduit 20P-F in the casing main body 20F, a first gasket GS1-F that is attached to the bottom face of the first closing mechanism 30F, and a second gasket GS2-F that is attached to the top face of the second closing mechanism 50F. The supply of fuel is fed from a fuel supply gun (not shown), while the first closing mechanism 30F and the second closing mechanism 50F move to open the respective openings in the fuel feeding device 10F. The detailed structure of the fuel feeding device 10F is discussed below.

The inlet pipe IP-F is a metal tubular body and has a fuel path IPa-F connecting with the fuel tank. The neck pipe NP-F is attached to the upper end of the inlet pipe IP-F. The neck pipe NP-F is a metal cylindrical body welded on and joined with the top of the inlet pipe IP-F. The neck pipe NP-F has a chamber NPa-F and a narrowed diametral connection tube NPb-F, which is connected with the top of the inlet pipe IP-F.

The casing main body 20F is set in the chamber NPa-F of the inlet pipe IP-F. The casing main body 20F has an outer tubular member 21F defining the fuel conduit 20P-F, a partition wall 22F protruded toward the center from the inner wall of the outer tubular member 21F, and a cylindrical partition member 24F that zones a part of an opening-side conduit section 20Pa-F. The partition wall 22F partly narrows the area of the fuel conduit 20P-F to separate the opening-side conduit section 20Pa from a tank-side conduit section 20Pb.

A first seat face 25F is formed on the top of the cylindrical partition member 24F above the outer tubular member 21F. The first gasket GS1-F is seated on the first seat face 25F to seal the opening-side conduit section 20Pa-F from the outside. A second seat face 26F is formed on the bottom face of the partition wall 22F. The second gasket GS2-F is seated on the second seat face 26F to seal the tank-side conduit section 20Pb-F from the opening-side conduit section 20Pa-F.

A support projection 27F is formed on the upper end of the casing main body 20F to support the first closing mechanism 30F in a pivotally rotatable manner. A guide projection 28F is formed on the inner wall of the casing main body 20F. The guide projection 28F is protruded toward the center of the opening-side conduit section 20Pa-F. A guide face 28Fa is formed on the inner wall of the guide projection 28F to guide the fuel supply gun to the seal opening 20Fb.

Figure 17:
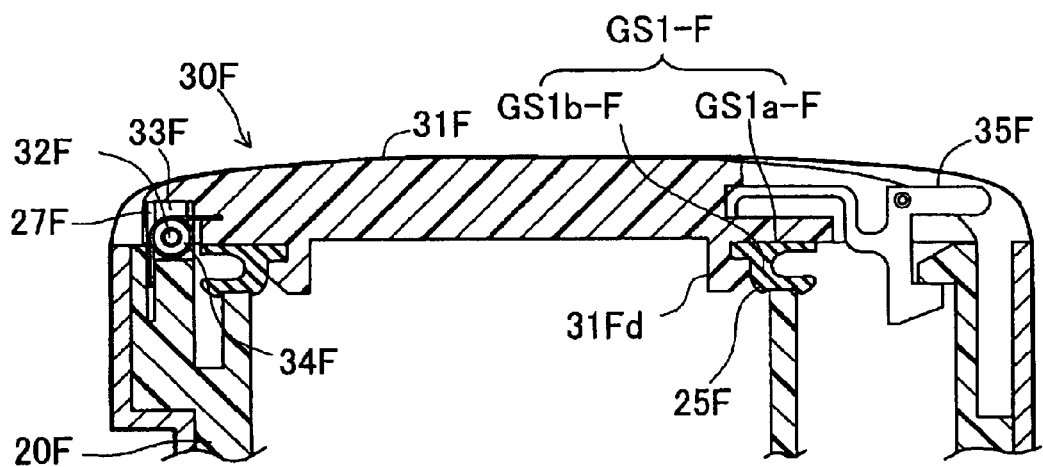
FIG. 17 is an enlarged sectional view illustrating the periphery of the first closing mechanism shown in FIG. 16.

FIG. 17 is an enlarged sectional view illustrating the periphery of the first closing mechanism 30F shown in FIG. 16. As shown in FIG. 17, the first closing mechanism 30F has a first closing member 31F that has a slightly curved upper face, a supported projection 33F that is protruded from one end of the first closing member 31F and is rotatably supported by the support projection 27F via a pivot pin 32F, and a first spring 34F that is disposed in a neighborhood of the supported projection 33F and presses the first closing member 31F in its opening direction. The first spring 34F is a torsion spring and has one end caught by one end of the first closing member 31F and the other end caught by the casing main body 20F.

Figure 18:
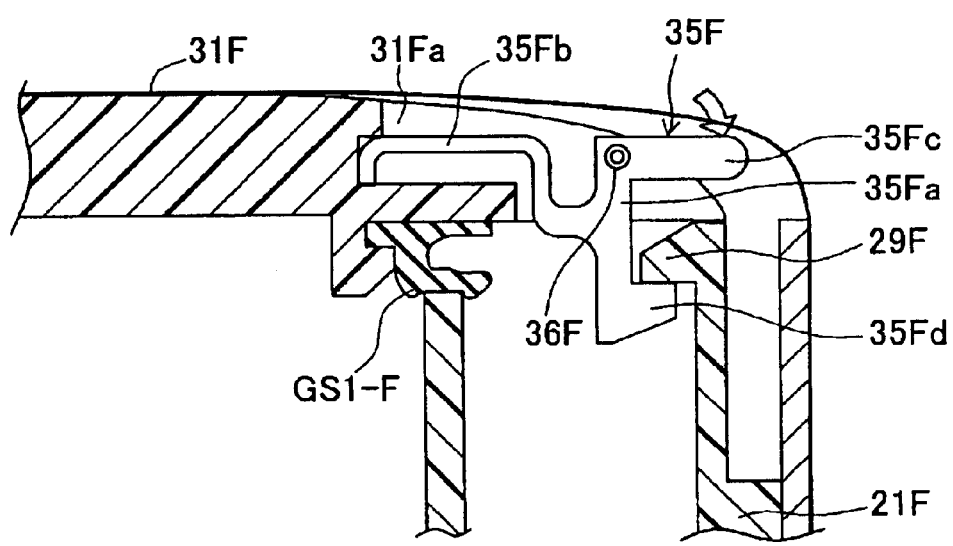
FIG. 18 is an-enlarged sectional view illustrating the periphery of the clamp shown in FIG. 16.

A clamp 35F is formed on the other end of the closing member 31F to keep the first closing member 31F in its closing position against the pressing force in the opening direction of the first spring 34F. FIG. 18 is an enlarged sectional view illustrating the periphery of the clamp 35F shown in FIG. 17. As shown in FIG. 18, the clamp 35F includes an arm 35Fa that is received in a recess 31Fa of the closing member 31F in a pivotally movable manner via a shaft 36F, a spring piece 35Fb that is protruded from one end of the arm 35Fa and is caught by one end of the recess 31Fa of the closing member 31F, a handle 35Fc that is manipulated to pivotally rotate the arm 35Fa, and an engaging claw 35Fd that is protruded downward from the arm 35Fa. The engaging claw 35Fd is formed to engage with an engaged claw 29F, which is protruded from the top of the outer tubular member 21F. When the handle 35Fc of the clamp 35F is pivotally rotated clockwise in the drawing from the closing position of the first closing member 31F, the engaging claw 35Fd is released from the engaged claw 29F against the pressing force of the spring piece 35Fb. When the clamp 35F is pivotally rotated to close the first closing member 31F from its opening position, on the other hand, the engaging claw 35Fd rides over and engages with the engaged claw 29F.

Referring back to FIG. 17, the first closing mechanism 30F has a ring-shaped seal support projection 31Fd, which is protruded from the bottom face thereof. The first gasket GS1-F is held on the outer circumference of the seal support projection 31Fd. The first gasket GS1-F is an integral rubber body including a thin ring-shaped seal base GS1a-F and an elastic sealing element GS1b-F protruded from the seal base GS1a-F to have an L-shaped cross section. The first gasket GS1-F is constructed in such a manner that the elastic sealing element GS1b-F is seated on the first seat face 25F by means of the closing action of the first closing mechanism 30F. The first gasket GS1-F is composed of a first rubber material having low-temperature sealing properties. Typical examples of the first rubber material include butadiene-acrylonitrile copolymer (NBR), alkyl-siloxane condensate (Q), and trifluoropropyl-methyl-siloxane condensate (FVMQ). Among the available examples of the first rubber material, NBR has the excellent sealing properties in a temperature range of −40 to 100° C.

Figure 19:
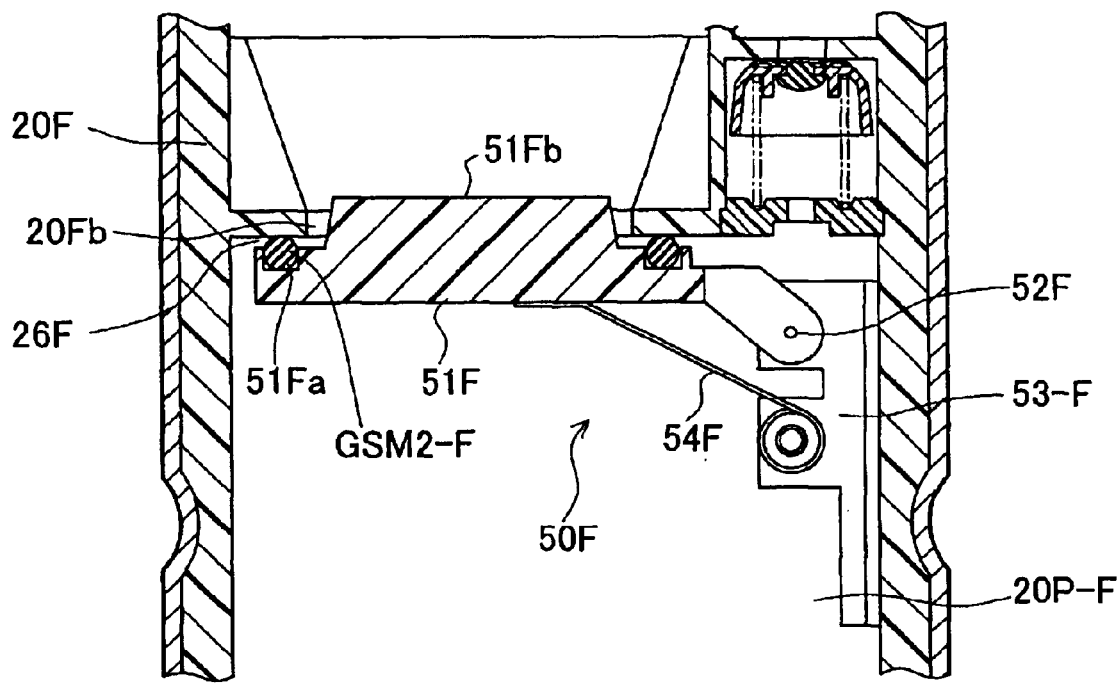
FIG. 19 is an enlarged sectional view showing the periphery of the second closing mechanism shown in FIG. 16.

FIG. 19 is an enlarged sectional view illustrating the periphery of the second closing mechanism 50F shown in FIG. 16. As shown in FIG. 19, the second closing mechanism 50F is a shutter that is closed in ordinary conditions and is arranged closer to the fuel tank than the first closing mechanism 30F in the fuel conduit 20P-F. The second closing mechanism 50F is constructed to open the seal opening 20Fb only in response to a push by the fuel supply gun.

The second closing mechanism 50F includes a second closing member 51F, a support shaft 52F, a fixation member 53F, and a second spring 54F. The second closing member 51F is supported in a pivotally rotatable manner on the fixation member 53F fixed to the casing main body 20F via the support shaft 52F. The second closing member 51F receives the pressing force of the second spring 54F and keeps the seal opening 20Fb of the casing main body 20F in its closing position.

A ring-shaped recess 51Fa is formed on the outer circumferential portion of the second closing member 51F to receive the second gasket GS2-F therein. The second gasket GS2-F is an O ring that presses the second seat face 26F and thereby seals the space between the second seat face 26F and the second closing member 51F.

The second gasket GS2-F is composed of a second rubber material, which is different from the first rubber material and has excellent fuel permeation resistance. Typical examples of the second rubber material include fluorine rubbers and highly saturated nitrile rubbers. Especially preferable are vinylidene fluoride-hexafluoropropylene copolymer (FKM) and hydrogenated butadiene acrylonitrile rubber (HNBR). Among the available examples of the second rubber material, FKM has a less permeation quantity than that of the first rubber material in an SHED permeation test for automobile fuels and thereby has the better fuel permeation resistance.

The center on the top face of the second closing member 51F forms a thicker center stepped portion 51Fb. The center stepped portion 51Fb has a height difference from the second gasket GS2-F and prevents the inserted end of the fuel supply gun from coming into contact with the second gasket GS2-F.

The following describes the opening and closing action of the fuel feeding device 10F. In the closing position of the first closing mechanism 30F shown in FIG. 16, the handle 35Fc shown in FIG. 18 is pressed downward to pivotally rotate the arm 35Fa. The pivotal rotation releases the engaging claw 35Fd from the engaged claw 29F and causes the first closing mechanism 30F to pivotally rotate and open the inlet opening 20Fa with the pressing force of the first spring 34F.

Figure 20:
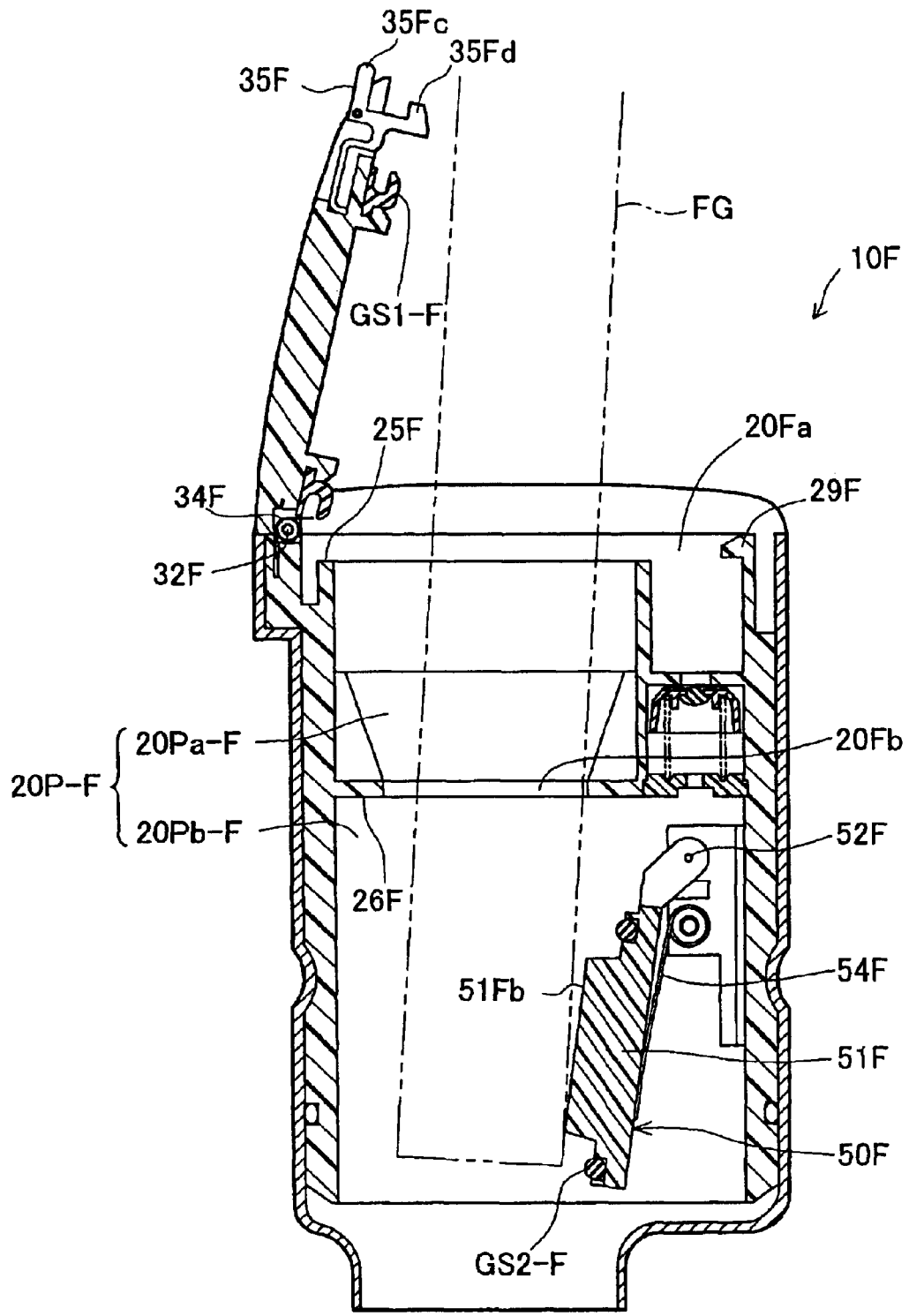
FIG. 20 shows a fuel feeding process with the fuel feeding device of the sixth embodiment.

The fuel supply gun FG is inserted through the inlet opening 20Fa into the fuel conduit 20P-F as shown in FIG. 20. The inserted end of the fuel supply gun FG goes into the seal opening 20Fb and presses the center stepped portion 51Fb on the top face of the second closing member 51F. The second closing member 51F then pivotally rotates about the support shaft 52F against the pressing force of the second spring 54F to open the seal opening 20Fb. The fuel supply gun FG goes into the further depth, and a supply of fuel is fed from the fuel supply gun FG through the tank-side conduit section 20Fb-F and the inlet pipe IP-F into the fuel tank. On completion of the fuel supply, when the fuel supply gun FG is drawn out, the second closing member 51F receives the pressing force of the second spring 54F and closes the seal opening 20Fb. The first closing member 31F receives a force in the closing direction and pivotally rotates about the pivot pin 32F. The engaging claw 35Fd of the clamp 35F rides over and engages with the engaged claw 29F, so that the first closing member 31F closes the inlet opening 20Fa. In this state, the first gasket GS1-F receives the pressing force of the first spring 34F and is seated on the first seat face 25F to close the inlet opening 20Fa. The second gasket GS2-F, on the other hand, receives the pressing force of the second spring and is seated on the second seat face 26F to close the seal opening 20b.

In the fuel feeding device 10F of this embodiment, the second gasket GS2-F composed of FKM has the excellent fuel permeation resistance and sealing properties in a temperature range of −10 to 100° C., while the first gasket GS1-F composed of NBR has the excellent sealing properties in a temperature range of not higher than 0° C. This arrangement thus ensures the distinguished sealing properties in a wide temperature range. The first gasket GS1F has the excellent sealing properties in the low temperature range that is not covered by the second gasket GS2-F. The fuel feeding device 10 accordingly has the sufficiently high sealing properties in a wide temperature range of −40 to 100° C.

The above embodiments are to be considered in all aspects as illustrative and not restrictive. There may be many modifications, changes, and alterations without departing from the scope or spirit of the main characteristics of the present invention. Some examples of possible modification are given below.

(1) The first and the second gaskets composed of the different materials discussed in the sixth embodiment are also applicable to any of the first through the fifth embodiments.

(2) A variety of structures may be applied to the first and the second closing members that are sealed by the first and the second gaskets. For example, the first closing member includes a spring in the closing direction, instead of the clamp. The first closing member may be constructed as a screwed cap. The second closing member may be coupled directly with the opening and closing action of the first closing member.

Industrial Applicability

The principle of the present invention is applicable to an inlet pipe, which is connected to a fuel tank of an automobile.

What is claimed is:

1. A fuel feeding device for a fuel tank, which is used to feed a supply of fuel from a fuel supply gun to the fuel tank through a fuel conduit, the fuel feeding device comprising:
   a partition member that parts the fuel conduit into an opening-side conduit section and a tank-side conduit section;
   a conduit forming member that is provided with a first seal opening disposed in the opening-side conduit section and a second seal opening formed in the partition member;
   a first shutter mechanism that bas a first closing member to open and close the first seal opening;
   a second shutter mechanism that has a second closing member to open and close the second seal opening; and
   a coupling mechanism that guides the second closing member to be opened and closed in conjunction with the opening and closing action of the first closing member, wherein the second closing member is opened in a direction in which the fuel supply gun is inserted in to the fuel conduit.

2. A fuel feeding device in accordance with claim 1, wherein the coupling mechanism comprises:
   a guide member that moves up and down with a pivotal rotation of the first closing member, so as to make the second closing member open and close the second seal opening; and
   a spring that presses the first closing member and the second closing member in a closing direction by means of the guide member.

3. A fuel feeding device in accordance with claim 2, wherein the partition member has a through hole, which the guide member passes through, and
   the coupling mechanism further comprises a third gasket, which is attached to the guide member and seals periphery of the through hole, while the second closing member closes the second seal opening.

4. A fuel feeding device in accordance with claim 1, wherein the first shutter mechanism comprises a first support arm that supports a lower face of the first closing member and rotates in a pivotal manner coaxially with the first closing member,
   the second shutter mechanism comprises a second support arm that supports a lower face of the second closing member and rotates in a pivotal manner coaxially with the second closing member, and
   the coupling mechanism transmits an opening and closing force of the first closing member to the second closing member through a movement of the first support arm and the second support arm.

5. A fuel feeding device in accordance with claim 4, wherein the coupling mechanism comprises:
   a first pinion gear that is arranged about a rotating shaft of the first support arm;
   a first rack gear that is formed on one end of a guide member to engage with the first pinion gear;
   a second pinion gear that is arranged about a rotating shaft of the second support arm; and
   a second rack gear that is formed on the other end of the guide member to engage with the second pinion gear,
   wherein the coupling mechanism is configured such that a rotating of the first support arm causes the first pinion gear and the first rack gear to rotate and to move the guide member, and the movement of the guide member causes the second support arm pivotally rotates via the second rack gear and the second pinion gear to open and close the second closing member.

6. A fuel feeding device in accordance with claim 1, the fuel feeding device further comprising a dust cap that is detachably attached to an upper end of an inlet pipe and covers an upper area of the first seal opening.

7. A fuel feeding device in accordance with claim 1, wherein the first closing member is supported on an upper end of an inlet pipe in a pivotally rotatable manner and is arranged to open the first seal opening when one end of the first closing member is pulled up, and
the coupling mechanism comprises a linkage mechanism that converts a force of pulling up the first closing member into a force of rotating the second closing member.

8. A fuel feeding device in accordance with claim 7, wherein the linkage mechanism is coupled with the second closing member through the second seal opening.

9. A fuel feeding device in accordance with claim 8, wherein the opening-side conduit section has multiple guide projections that are protruded toward a center of the opening-side conduit section, the guide projections extending to a certain position to prevent a fuel supply gun from interfering with the linkage mechanism while the first closing member is open.

10. A fuel feeding device in accordance with claim 1, wherein the first closing member has a pressure regulator for regulating pressure in the fuel tank.

11. A fuel feeding device in accordance with claim 1, the fuel feeding device further comprising:
a first gasket that is composed of a first sealing material and is interposed and seals between a periphery of the first seal opening and the first closing member; and
a second gasket that is composed of a second sealing material and is interposed and seals between a periphery of the second seal opening and the second closing member,
wherein the first sealing material of the first gasket is different from the second sealing material of the second gasket.

12. A fuel feeding device in accordance with claim 11, wherein the first sealing material has better sealing properties at low temperatures than the second sealing material.

13. A fuel feeding device in accordance with claim 12, wherein the first sealing material is any one of butadiene-acrylonitrile copolymer (NBR), alkyl-siloxane condensate (Q), and trifluoropropyl-methyl-siloxane condensate (FVMQ).

14. A fuel feeding device in accordance with claim 12, wherein the second sealing material is any one of vinylidene fluoride-hexafluoropropylene copolymer (FKM) and hydrogenated butadiene acrylonitrile rubber (HNBR).

15. A fuel feeding device for a furl tank, which feeds a supply of fuel to the fuel tank through a fuel conduit of an inlet pipe, the fuel feeding device comprising:
a conduit forming member that defines the fuel conduit and has a first seat face, which faces the fuel conduit and is formed closer to an inlet opening of the fuel conduit, and a second seat face, which faces the fuel conduit and is formed closer to the fuel tank than the first seat face;
a first closing member that is moved in a closing direction toward the first seat face;
a first gasket that is composed of a first sealing material and is seated on the first seat face
by a closing action of the first closing member,
a second closing member that is moved in a closing direction toward the second seat face; and
a second gasket that is composed of a second sealing material, wherein the first seating material has better sealing properties at low temperatures than the second sealing material.

16. A fuel feeding device in accordance with claim 15, wherein the first sealing material is any one of butadiene-acrylonitrile copolymer (NBR), alkyl-siloxane condensate (Q), and trifluoropropyl-methyl-siloxane condensate (FVMQ).

17. A fuel feeding device in accordance with claim 15, wherein the second sealing material is any one of vinylidene fluoride-hexafluoropropylene copolymer (FKM) and hydrogenated butadiene acrylonitrile rubber (HNBR).

18. A fuel feeding device in accordance with claim 15, wherein a top face of the second closing member includes a relatively thicker center stepped portion, the center stepped portion being configured to have a height difference from the second gasket and to prevent an inserted end of the fuel supply gun from coming into contact with the second gasket.

19. A fuel feeding device in accordance with claim 18, wherein the second gasket is received on a ring-shaped recess formed on an outer circumferential portion of the second closing member.

* * * * *